US010638352B2

(12) United States Patent
Liu et al.

(10) Patent No.: US 10,638,352 B2
(45) Date of Patent: *Apr. 28, 2020

(54) FEMTOCELL LOCAL BREAKOUT MANAGEMENT SERVICES

(71) Applicants: AT&T Intellectual Property I, L.P., Atlanta, GA (US); AT&T Mobility II LLC, Atlanta, GA (US)

(72) Inventors: Cheng P. Liu, Johns Creek, GA (US); Alireza Farid Faryar, Fair Haven, NJ (US); Kurt Huber, Kennesaw, GA (US); Henry Jackson Fowler, Jr., Alpharetta, GA (US); Robert C. Streijl, Brighton, MA (US)

(73) Assignees: AT&T INTELLECTUAL PROPERTY I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 149 days.

This patent is subject to a terminal disclaimer.

(21) Appl. No.: 14/857,782

(22) Filed: Sep. 17, 2015

(65) Prior Publication Data

US 2016/0007225 A1   Jan. 7, 2016

Related U.S. Application Data

(63) Continuation of application No. 14/449,890, filed on Aug. 1, 2014, now Pat. No. 9,185,543, which is a
(Continued)

(51) Int. Cl.
*H04W 28/02* (2009.01)
*H04W 56/00* (2009.01)
(Continued)

(52) U.S. Cl.
CPC ........ *H04W 28/0231* (2013.01); *H04L 47/10* (2013.01); *H04L 47/12* (2013.01);
(Continued)

(58) Field of Classification Search
None
See application file for complete search history.

(56) References Cited

U.S. PATENT DOCUMENTS 6,628,610 B1 * 9/2003 Waclawsky ............. H04L 47/10
370/229
6,735,202 B1 * 5/2004 Ahmed ............. H04L 29/12009
370/392
(Continued)

OTHER PUBLICATIONS

Office Action dated Aug. 5, 2016 for U.S. Appl. No. 14/735,914, 28 pages.
(Continued)

*Primary Examiner* — Mansour Oveissi
(74) *Attorney, Agent, or Firm* — Amin, Turocy & Watson, LLP

(57) ABSTRACT

Management services are provided during local breakout at a femto access point (FAP). In an aspect, the FAP facilitates policy management and employs a policy component to perform an analysis and enforce a set of policies for dynamically selecting an optimal route for traffic received at the FAP based on a decision-making process. Typically, the set of policies can specify different routes based on various factors, such as, but not limited to, type of traffic, current and/or future network resource availability, current time, day and/or date, location of the FAP, location of a UE sending/receiving the traffic, a lowest cost route, and/or route based on cost-benefit, etc. Further, a monitoring component is employed to observe the route employed by that traffic, which can be utilized by various services, such as, billing,
(Continued)

US 10,638,352 B2
Page 2

Quality of Service, security management, address management, failure management and/or provisioning.

20 Claims, 15 Drawing Sheets

Related U.S. Application Data continuation of application No. 12/623,237, filed on Nov. 20, 2009, now Pat. No. 8,831,566.

(60) Provisional application No. 61/117,005, filed on Nov. 21, 2008.

(51) Int. Cl.

| | | |
|---|---|---|
| *H04L 12/801* | (2013.01) | |
| *H04W 28/08* | (2009.01) | |
| *H04W 64/00* | (2009.01) | |
| *H04W 4/24* | (2018.01) | |
| *H04W 36/00* | (2009.01) | |
| *H04W 40/02* | (2009.01) | |
| *H04W 88/12* | (2009.01) | |
| *H04W 24/02* | (2009.01) | |
| *H04W 40/24* | (2009.01) | |
| *H04L 29/06* | (2006.01) | |
| *H04W 24/08* | (2009.01) | |
| *H04W 72/04* | (2009.01) | |
| *H04W 80/04* | (2009.01) | |
| *H04W 84/04* | (2009.01) | |
| *H04W 88/16* | (2009.01) | |

(52) U.S. Cl.
CPC .............. *H04L 69/03* (2013.01); *H04L 69/22* (2013.01); *H04W 4/24* (2013.01); *H04W 24/02* (2013.01); *H04W 24/08* (2013.01); *H04W 28/0226* (2013.01); *H04W 28/0268* (2013.01); *H04W 28/0289* (2013.01); *H04W 28/08* (2013.01); *H04W 36/0022* (2013.01); *H04W 40/02* (2013.01); *H04W 40/248* (2013.01); *H04W 56/00* (2013.01); *H04W 56/001* (2013.01); *H04W 64/00* (2013.01); *H04W 72/0493* (2013.01); *H04W 88/12* (2013.01); *H04W 80/04* (2013.01); *H04W 84/045* (2013.01); *H04W 88/16* (2013.01)

(56) References Cited

U.S. PATENT DOCUMENTS

| | | | | |
|---|---|---|---|---|
| 6,826,150 B1* | 11/2004 | Bhattacharya | .......... | H04L 47/10 370/230 |
| 6,829,230 B1* | 12/2004 | Tiuri | .................. | H04L 29/12216 370/351 |
| 6,847,610 B1* | 1/2005 | Suumaki | ............. | H04L 12/5695 370/230.1 |
| 7,369,489 B1* | 5/2008 | Bhattacharya | .......... | H04L 47/10 370/230 |
| 7,843,843 B1* | 11/2010 | Papp, III | ................. | H04L 12/26 370/252 |
| 7,844,729 B1* | 11/2010 | Friedman | ................ | H04L 41/12 709/238 |
| 7,953,002 B2* | 5/2011 | Opsasnick | .............. | H04L 47/10 370/230 |
| 8,150,400 B1* | 4/2012 | Jordan, Jr. | ............ | H04W 48/17 455/405 |
| 8,370,909 B2* | 2/2013 | Heffez | ................. | H04L 63/107 705/14.23 |
| 8,738,696 B2* | 5/2014 | Flynn | .................... | H04L 67/327 455/425 |
| 8,811,338 B2* | 8/2014 | Jin | ..................... | H04W 60/005 370/331 |
| 8,831,566 B2 | 9/2014 | Liu et al. | | |
| 2002/0181395 A1 | 12/2002 | Foster et al. | | |
| 2002/0191595 A1 | 12/2002 | Mar et al. | | |
| 2003/0054795 A1 | 3/2003 | Tamaki et al. | | |
| 2003/0103611 A1* | 6/2003 | Lapstun | .................. | B41J 3/445 379/201.01 |
| 2003/0169771 A1* | 9/2003 | Ahn | .................... | H04L 12/2856 370/497 |
| 2004/0051664 A1* | 3/2004 | Frank | ................... | G01S 5/0252 342/457 |
| 2004/0125937 A1 | 7/2004 | Turcan et al. | | |
| 2004/0243715 A1 | 12/2004 | Yokoyama | | |
| 2005/0089042 A1* | 4/2005 | Ruutu | ................. | H04L 12/5693 370/395.21 |
| 2005/0152401 A1* | 7/2005 | Wiljakka | ................ | H04W 8/26 370/474 |
| 2005/0235348 A1 | 10/2005 | Coley et al. | | |
| 2005/0265363 A1* | 12/2005 | Chen | ...................... | H04L 29/06 370/401 |
| 2006/0025154 A1* | 2/2006 | Alapuranen | ............ | H04W 4/02 455/456.1 |
| 2006/0036762 A1* | 2/2006 | Vadlakonda | ............ | H04L 45/02 709/238 |
| 2006/0099935 A1* | 5/2006 | Gallagher | ............. | H04W 8/065 455/414.1 |
| 2006/0105775 A1* | 5/2006 | Von Kaenel | ............ | H04L 41/12 455/456.1 |
| 2006/0221819 A1* | 10/2006 | Padwekar | ................ | H04L 47/20 370/229 |
| 2006/0250578 A1 | 11/2006 | Pohl et al. | | |
| 2006/0262732 A1* | 11/2006 | Joutsenvirta | .......... | H04W 28/18 370/254 |
| 2007/0005808 A1* | 1/2007 | Day | ...................... | H04L 41/145 709/248 |
| 2007/0053362 A1* | 3/2007 | Garg | ...................... | H04L 41/00 370/395.1 |
| 2007/0253359 A1 | 11/2007 | Hall | | |
| 2007/0258427 A1* | 11/2007 | Shaheen | .............. | H04W 76/022 370/338 |
| 2008/0013477 A1* | 1/2008 | Claussen | ............... | H04W 16/16 370/328 |
| 2008/0020775 A1* | 1/2008 | Willars | .................... | H04L 47/10 455/445 |
| 2008/0037552 A1* | 2/2008 | Dos Remedios | ... | H04L 41/0896 370/395.21 |
| 2008/0207170 A1 | 8/2008 | Khetawat et al. | | |
| 2008/0261574 A1* | 10/2008 | Rinta-Aho | ............ | H04W 48/10 455/414.3 |
| 2008/0311914 A1* | 12/2008 | Tinnakornsrisuphap | ..................... | H04W 36/0083 455/436 |
| 2009/0046074 A1 | 2/2009 | Shneidman et al. | | |
| 2009/0054070 A1* | 2/2009 | Gallagher | ............. | H04W 16/16 455/445 |
| 2009/0061821 A1 | 3/2009 | Chen et al. | | |
| 2009/0098890 A1 | 4/2009 | Vasudevan et al. | | |
| 2009/0100492 A1 | 4/2009 | Hicks et al. | | |
| 2009/0129263 A1* | 5/2009 | Osborn | ............... | H04W 76/022 370/230 |
| 2009/0168766 A1 | 7/2009 | Eyuboglu et al. | | |
| 2009/0207843 A1 | 8/2009 | Andreasen | | |
| 2009/0245199 A1* | 10/2009 | Pathan | .................. | H04W 28/26 370/331 |
| 2009/0268668 A1 | 10/2009 | Tinnakornsrisuphap et al. | | |
| 2009/0279543 A1* | 11/2009 | Strom | ................. | H04W 76/027 370/389 |
| 2009/0285176 A1 | 11/2009 | Zheng et al. | | |
| 2009/0311987 A1* | 12/2009 | Edge | .................... | H04Q 3/0045 455/404.1 |
| 2010/0039992 A1* | 2/2010 | Prakash | ................ | H04W 8/005 370/328 |
| 2010/0054129 A1* | 3/2010 | Kuik | ................. | H04L 47/10 370/235 |
| 2010/0056144 A1 | 3/2010 | Gallagher et al. | | |

(56) References Cited

U.S. PATENT DOCUMENTS

| | | | | |
|---|---|---|---|---|
| 2010/0088425 A1* | 4/2010 | Hooda | ................... | H04W 4/001 709/231 |
| 2010/0103924 A1* | 4/2010 | Rao | ....................... | H04W 16/14 370/351 |
| 2010/0159895 A1* | 6/2010 | Wallis | ..................... | H04M 3/58 455/414.1 |
| 2011/0038318 A1* | 2/2011 | Parsons | ................. | H04W 80/04 370/328 |
| 2012/0026865 A1* | 2/2012 | Fan | .................... | H04W 72/0486 370/225 |
| 2012/0094643 A1* | 4/2012 | Brisebois | .............. | H04W 8/245 455/418 |
| 2012/0289246 A1* | 11/2012 | Huber | ................ | G06Q 20/1235 455/456.1 |

OTHER PUBLICATIONS

Office Action dated Aug. 23, 2016 for U.S. Appl. No. 14/804,304, 45 pages.
Office Action dated Feb. 10, 2016 for U.S. Appl. No. 14/804,304, 33 pages.
Office Action dated Feb. 3, 2016 for U.S. Appl. No. 14/735,914, 40 pages.
Office Action dated Mar. 19, 2013 for U.S. Appl. No. 12/623,210, 28 pages.
Office Action dated Feb. 1, 2013 for U.S. Appl. No. 12/623,237, 29 pages.
Office Action dated Oct. 1, 2013 for U.S. Appl. No. 12/623,176, 28 pages.
Office Action dated Oct. 30, 2013 for U.S. Appl. No. 12/623,210, 27 pages.
Office Action dated Dec. 30, 2013 for U.S. Appl. No. 12/623,237, 28 pages.
Office Action dated Oct. 31, 2014 for U.S. Appl. No. 14/304,297, 21 pages.
Office Action dated Dec. 3, 2014 for U.S. Appl. No. 14/332,131, 23 pages.
Office Action dated Feb. 25, 2015 for U.S. Appl. No. 14/449,890, 26 pages.
Office Action dated Sep. 4, 2015 for U.S. Appl. No. 14/735,914, 27 pages.
Office Action dated Oct. 7, 2015 for U.S. Appl. No. 14/804,304, 25 pages.
Office Action dated May 30, 2017 for U.S. Appl. No. 14/804,304, 27 pages.
Office Action dated Jan. 25, 2017 for U.S. Appl. No. 14/804,304, 31 pages.
OA dated Feb. 1, 2012 for U.S. Appl. No. 12/623,176, 22 pages.
OA dated Mar. 1, 2012 for U.S. Appl. No. 12/623,210, 19 pages.
OA dated Mar. 1, 2012 for U.S. Appl. No. 12/623,223, 15 pages.
OA dated May 31, 2012 for U.S. Appl. No. 12/623,176, 20 pages.
OA dated Jul. 31, 2012 for U.S. Appl. No. 12/623,210, 25 pages.
OA dated Jul. 9, 2012 for U.S. Appl. No. 12/623,223, 29 pages.
OA dated Jun. 26, 2012 for U.S. Appl. No. 12/623,237, 29 pages.

* cited by examiner

FEMTOCELL LOCAL BREAKOUT MANAGEMENT SERVICES

CROSS-REFERENCE TO RELATED APPLICATIONS

This application is a continuation of, and claims the benefit of priority to each of, U.S. patent application Ser. No. 14/449,890, filed on Aug. 1, 2014 and entitled "FEMTOCELL LOCAL BREAKOUT MANAGEMENT SERVICES," which is a continuation of, and claims the benefit of priority to, U.S. patent application Ser. No. 12/623,237, filed on Nov. 20, 2009 and entitled "FEMTOCELL LOCAL BREAKOUT MANAGEMENT SERVICES" (now U.S. Pat. No. 8,831,566, issued on Sep. 9, 2014), which claims the benefit of priority to U.S. Provisional Patent Application No. 61/117,005, filed on Nov. 21, 2008, and entitled "FEMTO CELL LOCAL BREAKOUT MECHANISMS". The entireties of each of the foregoing applications are incorporated herein by reference

TECHNICAL FIELD

The subject disclosure relates to wireless communications and, more particularly, to management services employed during local breakout at a femto access point.

BACKGROUND

Femtocells—building-based wireless access points interfaced with a wired broadband network—are traditionally deployed to improve indoor wireless coverage, and to offload traffic from a mobility radio access network (RAN) operated by a wireless service provider Improved indoor coverage includes stronger signal, increased bandwidth, and improved reception (e.g., video, sound, or data), ease of session or call initiation, and session or call retention, as well. Offloading traffic from a RAN reduces operational and transport costs for the service provider since a lesser number of end users consumes macro RAN over-the-air radio resources (e.g., radio traffic channels), which are typically limited. With the rapid increase in utilization of communications networks and/or devices, mobile data communications have been continually evolving due to increasing requirements of workforce mobility, and, services provided by femtocells can be extended beyond indoor coverage enhancement.

Conventional systems that employ femtocells, transport information (e.g., data and/or voice) from a user equipment (UE) including Internet bound traffic through a landline network to a mobility core network. The information is received at the mobility core network and the Internet bound data can be identified and routed to the Internet from the core network. This hairpin type of traffic routing can lead to significant network resource utilization and causes congestion in the landline network and/or mobility core network. Further, since data sent by the UE is routed to the Internet from the mobility core network only after traversing through the landline network, the communication time is substantially high.

Traditional femtocells transport UE traffic to the mobile service provider network (e.g., core network) via a wireline broadband network (Digital subscriber line (DSL), Cable, Fiber, etc.). During UE-to-UE communication, the traffic is directed from one UE to another via the core network, even when both the UEs are attached to the femtocell. Accordingly, bandwidth utilization in the traditional approach is inefficient and can negatively impact performance and customer satisfaction.

DETAILED DESCRIPTION

Figure 1:
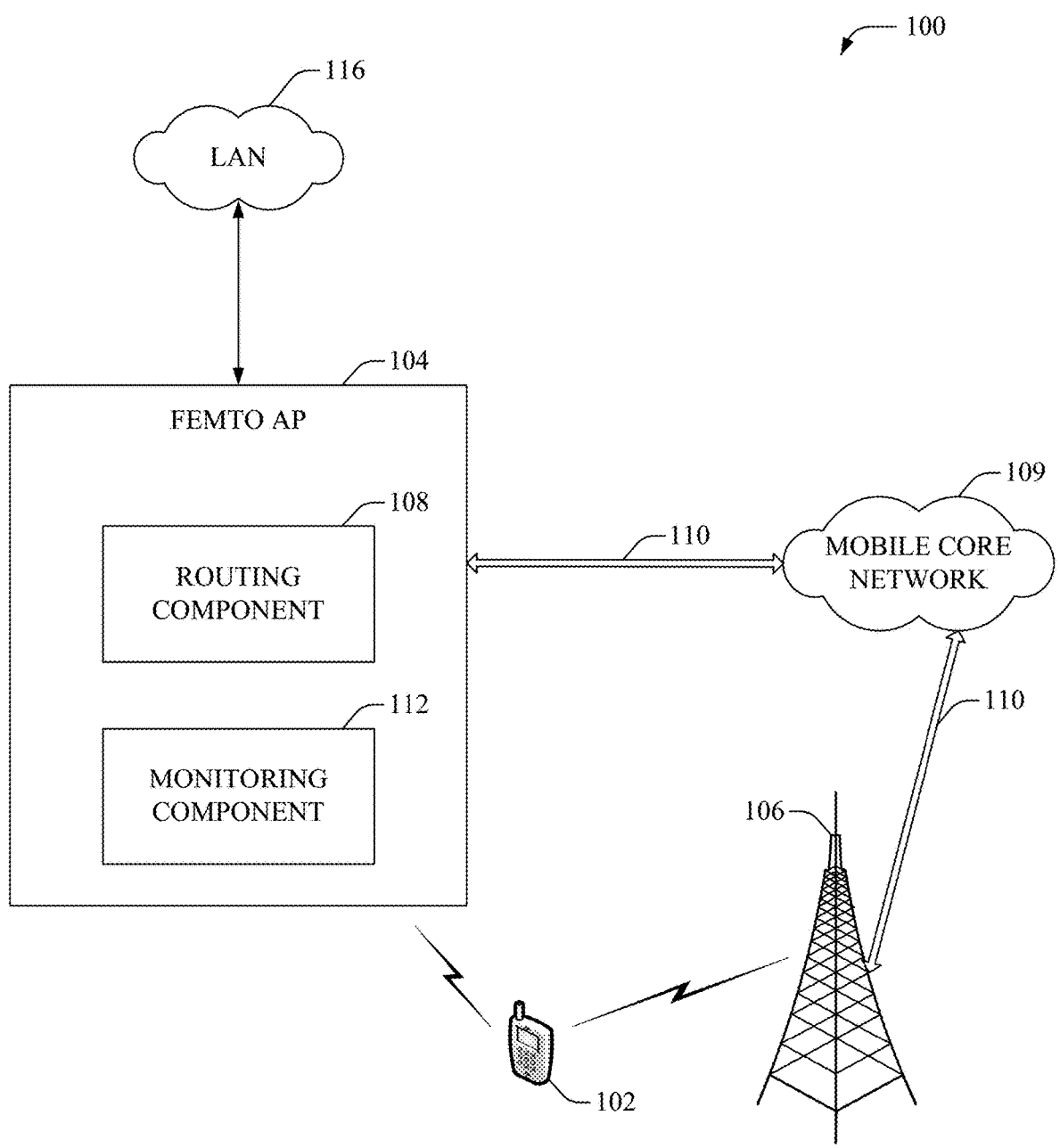
FIG. 1 illustrates an example system that facilitates efficient utilization of network bandwidth during wireless communication in a femtocell.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "platform," "service,"

"framework," "connector," "agent," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the various embodiments.

In addition, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile," subscriber station," "access terminal," "terminal," "handset," "mobile device," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. Additionally, the terms "femtocell network", and "femto network" are utilized interchangeably, while "macro cell network" and "macro network" are utilized interchangeably herein. Further, the terms "core network", "mobility core network", "mobile core network", "core mobility network", "core mobile network" and "mobility network" are utilized interchangeably herein.

Furthermore, the terms "user," "subscriber," "customer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth. In addition, the terms "femtocell access point", "femtocell," "femto access point," "home base station," "home eNode B (HeNB)," "home Node B (HNB)," and the like are also utilized interchangeably.

Aspects, features, or advantages of the subject innovation can be exploited in substantially any wireless communication technology; e.g., Wi-Fi, Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), or Zigbee. Additionally, substantially all aspects of the subject innovation can be exploited in legacy telecommunication technologies.

The systems and methods disclosed herein, in one aspect thereof, can facilitate local breakout mechanisms at a femto access point (FAP) to reduce backhaul and/or core mobility network congestion. Moreover, a slave Gateway GPRS Support Node (GGSN) can be integrated within the FAP to directly route the incoming traffic from a user equipment (UE) at the FAP. In one example, Internet bound traffic can be directly routed to the Internet via a wireline network, for example, Digital home (DH) Local Area Network (LAN). In another example, traffic bound to a locally connected UE, can be directly routed to the UE from the FAP, without routing the traffic through the core mobility network. In one aspect, a monitoring component can be employed to observe communication routing at the FAP.

In accordance with another aspect of the system, a billing component can analyze data from the monitoring component and update a record in a billing database associated with the communication. Moreover, the billing charge applied for the communication can vary based on the route employed by the communication. Additionally or alternately, the FAP can include a usage collection component that can collect usage data from a UE, when the UE is attached to the FAP, and provide the usage data directly to the utility company. Further, a QoS component can be utilized for mapping and/or translating QoS classes during normal IP connection with a mobile core network or a breakout session at the FAP. In another aspect, a policy component can be included within the FAP to facilitate policy based routing of traffic. Typically, the policy component can enforce one or more policies that can be applied for traffic routing, to select an optimal route for traffic received at the FAP based on a variety of real-time network conditions and the customer's specific service sections/options/features. The policies can be utilized for selecting the optimal route based on various factors, such as, but not limited to, type of traffic, current and/or future network resource availability, current time, day and/or date, location of the FAP, location of a UE sending/receiving the traffic, cost associated with the routes, a type of service acquired (e.g., business continuity for enterprise customers) from the service provider etc. Additionally, the FAP can include functionality for security management, address management, failure management and/or provisioning.

Yet another aspect of the disclosed subject matter relates to a method that can be employed for analyzing a set of routing policies to facilitate optimal routing at a FAP that supports local breakout. The method comprises enforcing a subset of policies that can be applied for route determination and determining an optimal route based on an analysis that employs the subset of policies. In one aspect, the policies can be specified by a network provider or authorized user at most any time. Moreover, the traffic received at the FAP can be routed based in part on the optimal route. Typically, an optimal route may also be chosen based on the QoS class required for the particular application. In addition, traffic routed at the FAP can be monitored and a billing fee associated with the traffic can be determined, based in part on an analysis of the monitored information.

Referring initially to FIG. 1, there illustrated is an example system 100 that facilitates efficient utilization of network bandwidth during wireless communication in a femtocell, according to an aspect of the subject disclosure. In one embodiment, a user equipment (UE) 102, can be located within a coverage area of a femto access point (FAP) 104 and can attach to the FAP 104 by employing most any attachment procedure. Typically, the UE 102 as disclosed herein can include most any communication device employed by a subscriber, such as, but not limited to, a cellular phone, a personal digital assistant (PDA), a laptop, a personal computer, a media player, a gaming console, and the like. Moreover, the UE 102 can access a mobile core network 109 through the femto network via FAP 104 and/or a macro network via base station 106. It can be appreciated that the macro network can include most any radio environment, such as, but not limited to, Universal Mobile Telecommunications System (UMTS), Global System for Mobile communications (GSM), LTE, CDMA, etc. The signaling and bearer technologies, for example circuit switched (CS), and/or packet switched (PS), in a femtocell and macro cell can be the same or different, depending on the radio technologies involved.

Typically, traffic flows between the FAP 104 and mobile core network 109, and/or between the base station 106 and mobile core network 109 through a broad band backhaul 110 (e.g., optical fiber based technologies (e.g., Ethernet, DS3, etc.), twisted-pair line based technologies (e.g., DSL, T1/E1 phone line, etc.), or coaxial cable based technologies (e.g., DOCSIS, etc.)). The FAP 104 can generally rely on the backhaul 110 for signaling, routing and paging, and for packet communication. According to an embodiment, the FAP 104 can include a routing component 108 that can be utilized to facilitate efficient management of traffic to and/or from the FAP 104.

In one example, the routing component 108 can include a slave Gateway GPRS Support Node (GGSN). Typically, the slave GGSN can implement functionality substantially similar to the functionality implemented by a GGSN in the mobile core network 109. For example, the slave GGSN can be employed to break a packet data protocol (PDP) context between UE 102 and GGSN in the mobile core network 109, and to implement a routing functionality to perform local breakout at the FAP 104. In addition, the slave GGSN can enable anchoring of a communication session at the routing component 108 rather than the core network GGSN. In the local breakout status, the slave GGSN can set up a (0,0) PDP context, e.g., (zero uplink data bandwidth, zero downlink data bandwidth) connection between slave GGSN and core GGSN while route (x,y), e.g., (x uplink data bandwidth, y downlink data bandwidth) with local network 116 or Internet. The (0,0) PDP context link can be utilized to switch a local breakout session to core network so the UE's 102 handover to new network can accomplished. In one aspect, the routing component 108 can receive traffic (e.g., voice, data, media, etc.) from the UE 102 and/or from the mobile core network 109 (e.g., via the broadband backhaul 110), analyze the received information and determine a route for the received traffic. According to one embodiment, the routing component 108 can selectively route UE traffic away from an Iuh Virtual Private Network (VPN) tunnel and send the traffic to a residential/enterprise local IP network destination, for example, via a home/enterprise network, Local Area Network (LAN), and/or a broadband access network (e.g., Internet) (not shown)

For example, the routing component 108 can receive communication packets sent by UE 102 connected to the FAP 104 and can determine information associated with the received packet that can facilitate routing of the packet from the FAP 104 via the slave GGSN. As an example, the routing component 108 can check an IP header associated with the received packet and determine a destination address. Based in part on the determined destination address, the routing component 108 can compute an optimal route to transfer the received packet, such that, network bandwidth is efficiently utilized. Moreover, the routing component 108 can facilitate route determination based in part on a destination address, source address, type of packet, type of protocol, one or more user and/or service provider defined rules or policies and/or user preferences. Additionally, the routing component 108 can utilize load balancing mechanisms, machine learning techniques, a cost and/or a cost benefit analysis to generate a route for the received packets.

Typically, a femto gateway (not shown) can aggregate regional traffic received from multiple FAPs and tunnel the traffic to the mobile core network 109. The conventional circuit switched (CS) traffic can be routed to a Mobile Switching Center (MSC) and the packet switched (PS) traffic can be routed to a Serving GPRS Support Node (SGSN) and Gateway GPRS Support Node (GGSN). According to an aspect, the routing component 108 can facilitate communication between UE 102 and a device on the LAN 116 by directly routing information between the UE 102 and the home network (e.g., without routing the traffic through the mobile core network 109). Accordingly, the UE 102 can communicate with a LAN device over the LAN 116 when UE 102 is attached to the FAP 104. It can be appreciated that when UE 102 detaches from the FAP 104, the mobile core network 109 can maintain a connection to the UE 102 via the mobility network (e.g., through base station 106). Similarly, routing component 108 can route Internet bound traffic, received from the UE 102, directly to the Internet, for example, via the LAN 116.

In particular, the routing component 108 can examine traffic sourced in the UE 102 to separate LAN bound, broadband access network bound and/or Internet bound traffic from the rest. A network address translation (NAT) can be performed to proxy the Internet Protocol (IP) address of UE 102 assigned by mobile core network with a LAN domain IP address. The routing component 108 can then send the IP traffic over the LAN 116. Similarly, the routing component 108 can examine traffic that sources in the LAN 116 and is destined to the UE 102. A NAT can be performed to proxy the home domain IP address with the IP address of the UE 102. Accordingly, the routing component 108 can deliver the traffic from the LAN 116 to the UE 102.

Additionally, routing component 108 can achieve UE-to-UE CS breakout traffic. Moreover, the routing component 108 can facilitate directly routing communication between two or more UEs connected to the FAP 104, without utilizing the backhaul 110. The routing performed at the FAP 104 can substantially save network capital investments, time and resources through lowered duplicity and/or increment of the network infrastructure. Further, the quality of customer applications can be improved and faster communication can be achieved.

According to one embodiment, the FAP 104 can further include a monitoring component 112 that can be employed to monitor the local breakout at the FAP 104. As an example, the monitoring component 112 can identify and/or store the type of communication, the amount of communication, the source and/or destination of the communication, and/or the route of the communication. For example, when communication is received from the UE 102 and the routing component 108 determines that local breakout can be performed to route the communication from the FAP 104 to the destination on the LAN 116, the monitoring component 112, can monitor and/or store information associated with the communication. Moreover, in this example, the monitoring component 112 can identify the source as UE 102, destination as a device (not shown) on the LAN 116, the duration and/or amount of communication, and/or the route as directly routed at FAP 104. In one aspect, the information monitored and/or collected by the monitoring component 112 can be specified by one or more policies, for example, user defined policy, service provider policy etc. According to an aspect, the monitored information can be utilized, for example, for load balancing, policy updates, Quality of Service (QoS) mapping, and/or billing services.

Figure 2:
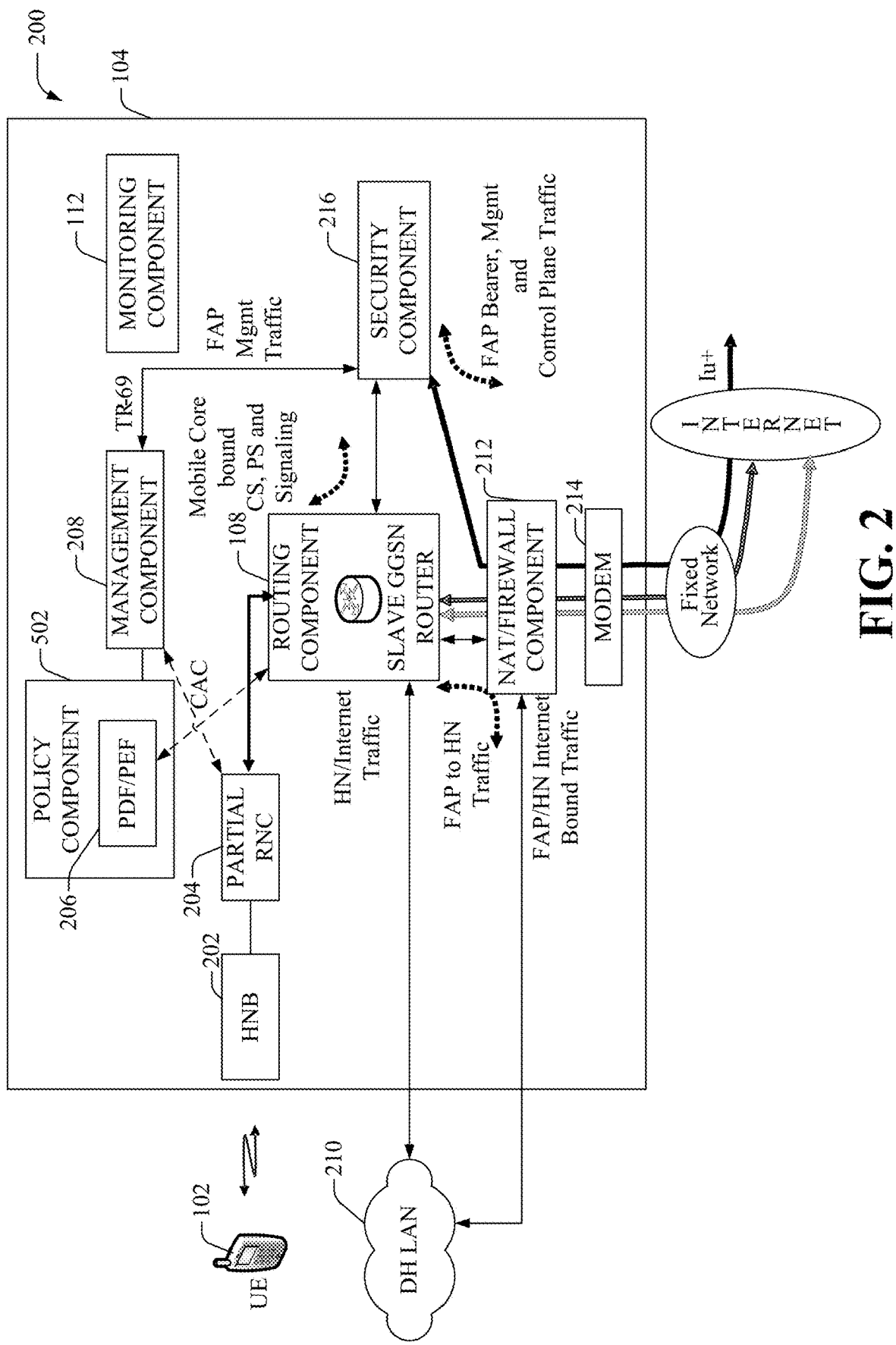
FIG. 2 illustrates an example system that can be employed to facilitate local breakout mechanisms, which efficiently utilize network bandwidth and/or resources associated with a backhaul pipe and/or a mobility core network.

Referring now to FIG. 2, there illustrated is an example system 200 that can be employed to facilitate efficient routing of traffic within a femtocell, according to an aspect of the subject disclosure. It can be appreciated that the UE 102, FAP 104, monitoring component 112, and routing component 108 can include respective functionality, as more fully described herein, for example, with regard to system 100. Moreover, system 200 includes a FAP 104 that can be integrated with a residential gateway (RG). Although FIG. 2 illustrates an RG that is integrated within the FAP 104, it can be appreciated that the RG can be externally connected to the FAP 104. Further, FAP 104 can be connected to a LAN, for example digital home (DH) LAN 210, by a wireless and/or wired connection. It can be appreciated that the DH LAN 210 disclosed herein can be most any LAN, provided by most any service provider, including a home or enterprise network, and can be deployed in most any area, such as but not limited to, a house, an office, a building, a warehouse, a store, a restaurant, a hotel, a factory, etc. Further, it can be appreciated that the service provider of the LAN can be the same as or disparate from the service provider of the mobility network.

Typically, the FAP 104 can receive communications from a UE 102. The UE 102 can be most any wireless communication device employed by a user, for example, a cellular phone, a gaming module, a television, a projector, personal computer, etc. Moreover, the UE 102 can utilize various technologies for terrestrial wireless communication, for example, an advanced second generation (2.5G) telecommunication technology such as Enhanced Data Rate for Global System for Mobile Communications (GSM) Evolution (EDGE); a third generation technology (3G) like Third Generation Partnership Project (3GPP) Universal Mobile Telecommunication System (UMTS), a 3GPP2 Evolution Data Only (EVDO) system, 3GPP Long Term Evolution (LTE), or Ultra-broadband Mobility (UMB); advanced 3G; or a fourth generation (4G) technology such as for example Long Term Evolution (LTE) Advanced. Additionally, a UE 102 can consume satellite-based traffic such as data originated from GPS, GLONNAS, or Galileo systems, conveyed through a deepspace link (not shown).

In one aspect, the Home Node B (HNB) 202 can receive communication from the UE 102 and can perform Node-B radio functions such as, but not limited to scheduling. Further, a partial Radio network control (RNC) 204 can be employed to perform Radio Resource Control (RRC), radio bearer (RB)/radio access bearers (RABs), radio access network (RAN) quality of service (QoS), call admission control (CAC)/Power/Congestion control, and the like. In accordance with an aspect, a routing component 108 can locally break out Internet and/or LAN bound traffic. In one aspect, the routing component 108 can include a slave GGSN. Moreover, information packets received from the UE 102 can be analyzed by the routing component 108 and a route to transfer the packets can be determined. In one example, the routing can be based in part on a destination address, source address, type of packet, type of protocol, one or more user and/or service provider defined rules or policies and/or user preferences.

According to an embodiment, a Policy component 502 can include one or more Policy Decision Functions/Policy Enforcement Functions (PDFs/PEFs) 206, which can be employed to drive the selection of the route. The policy component 502 can execute and choose the best route for enforcement. The policies can be specified, for example, by a service provider through a management component 208. The management component 208 can be employed to facilitate FAP management (FAP white list, policy rule updates, Ethernet/IP port management, FAP firmware updates, GSN routing function management, performance and alarm status update etc.). Additionally, the management component 208 can employ Broadband Forum Technical Report 069 (TR-69) protocol to communicate with a femto provisioning/management platform in the service provider network. Policies to be enforced by the FAP 104 can thus be downloaded to an internal storage in the FAP and/or connected to the FAP, and can be replaced, modified, etc. (e.g., managed), manually and/or automatically depending on the service selections, into the FAP 104 from the service provider network as needed.

According to an aspect, when a customer installs the FAP 104, during setup (or at any other time), the management component 208 can facilitate authentication of the FAP 104 with the mobility network, such that, the service provider can recognizes the FAP 104 and can ensure that the customer and/or FAP 104 is legitimate. Further, once the customer and/or FAP 104 is authenticated, the management component 208 can download configuration information (e.g., service provider policies including QoS, rules, definitions) and parameters that can facilitate connection with the core network elements (e.g., GGSN). In an additional or alternate aspect, the management component 208 can provide the service provider with an interface to mange functions such as, but not limited to PDF/PEF on the FAP 104.

In one embodiment, the management component 208 can provide an interface that enables a mobility network operator/service provider/mobility network element to control the local breakout mechanism, for example, by specifying policies in the PDF/PEF. In one example, the management component 208 can also provide mobility network operator/service provider/mobility network element with an override functionality. Moreover, the mobility network operator/service provider/mobility network element can utilize the override functionality to stop local breakout at most any time and/or for a specified time period. Specifically, the override functionality can be employed by a service provide upon legal request and/or for security purposes. For example, a legal/security request can be made (e.g., by a government agency) to monitor communication through a particular FAP and the service provider can utilize the management component 208 to override the breakout mechanisms employed at the FAP, such that all communication at the FAP can be transferred via the mobility network. Moreover, the management component 208, in response to the override command, can disable breakout functionality at the routing component 108 and/or create and enforce a policy, which ensures that local breakout is not performed at the FAP 104.

The routing component 108, based in part on factors, for example, the analysis, the PDF/PEF, etc., identifies an optimal route for traffic received at the FAP 104. In one aspect, when traffic is received from the UE 102, the routing component 108 can identify whether the traffic should be routed to the core mobility network, via a tunnel (e.g., Iu tunnel), to the Internet via the DH LAN 210, a device on the DH LAN 210 and/or a disparate UE (not shown) attached to the FAP 104. Based on the determination, the routing component 108 can deliver the traffic via the identified route. In another example, the routing component 108 can receive traffic from the device on the DH LAN 210 and can determine an optimal route (e.g., to UE 102, or core mobility network, etc.) for the traffic, for example, by employing one or more policies in the PDF/PEF 206, and route the traffic via the optimal route, as explained in detail infra with respect to FIG. 5.

Additionally or alternately, a Network Address Translation (NAT)/Firewall component 212 (e.g., IPv4) can be employed to map network address information in packet headers that can be routed via the backhaul network and/or the DH LAN 210. Typically, the RG can provision the femtocell with an IP address when the femtocell attaches to the home/enterprise network, for example DH LAN 210. When the routing component 108 determines that the traffic (e.g., from UE 102) can be routed to the DH LAN 210, the NAT/Firewall component 212 can employ a NAT function to replace the IP address of UE 102 in a packet header, with a DH network domain IP address associated with the DH LAN 210. Similarly, when the routing component 108 determines that the traffic (e.g., from DH LAN 210) can be routed to the UE 102, the NAT/Firewall component 212 can utilize a NAT function to replace the home/enterprise domain IP address with the IP address of the UE 102.

Further, the NAT/Firewall component 212 can employ a firewall for intrusion detection and/or prevention for UE 102 to home/enterprise network traffic and vice versa. Furthermore, the firewall can allow or prevent a device on the DH LAN 210 to access the mobility network through a tunnel (e.g., Iuh tunnel). In one aspect, the NAT/firewall component 212 can enforce, and thus can embody a PEF, one or more policy decisions (from a PDF), to control access of the mobility network by the device on the DH LAN 210. For example, the firewall can protect the digital home network and prohibit bridging the DH LAN 210 with the Internet through the mobility core network. It can be appreciated that the firewall can be hardware, software, or a combination thereof. In one example, a modem 214 (DSL or most any broadband modem) can be employed for transmission of packets through the backhaul network to the core mobility network. Furthermore, the FAP 104 can include a security component 216 that can utilize most any encryption technique for secure channel set up and/or tear down and/or encryption of outbound traffic. For example, the security component 216 can perform encryption for establishing the Iu tunnel.

Figure 3:
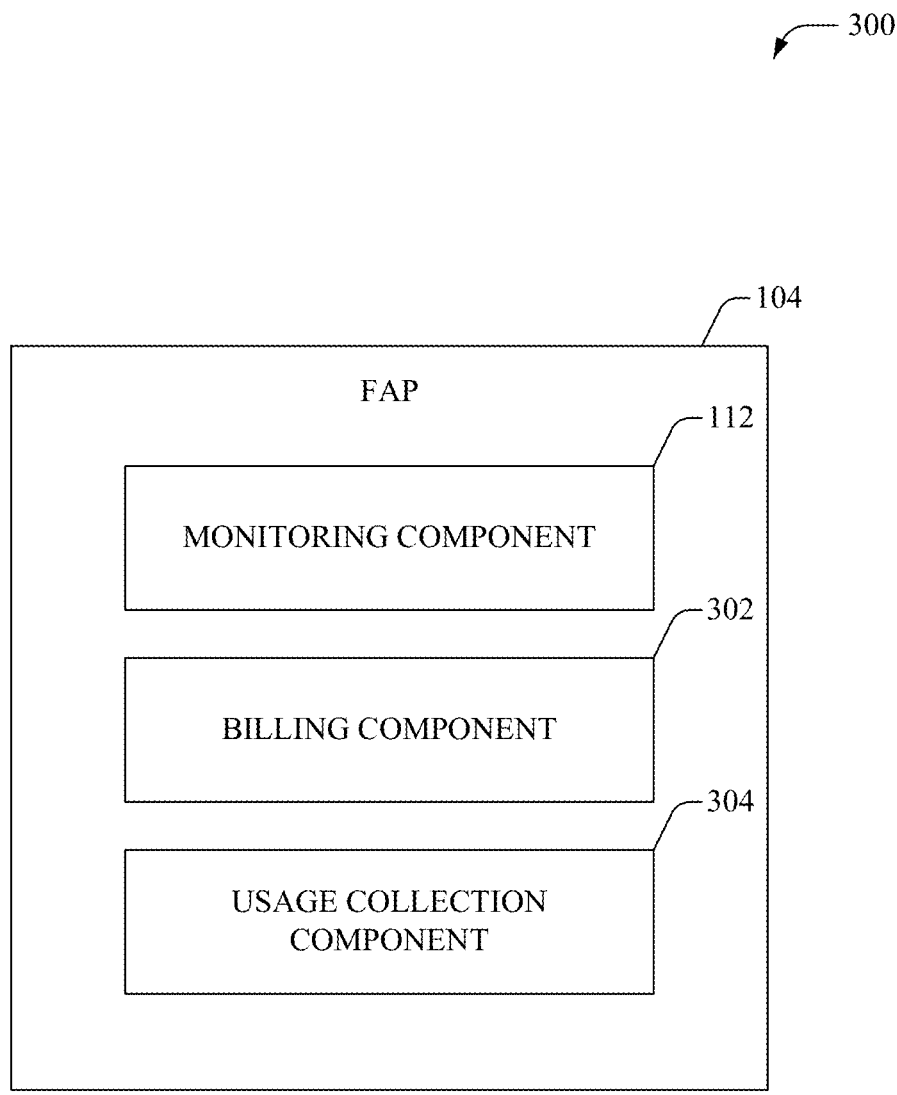
FIG. 3 illustrates an example system that can be employed to facilitate billing management associated with local breakout mechanisms at a femto access point (FAP).

Referring to FIG. 3, there illustrated is an example system 300 that can facilitate billing management associated with local breakout mechanisms at a femto access point 104, according to an aspect of the subject specification. It can be appreciated that the FAP 104 and monitoring component 112 can include functionality, as more fully described herein, for example, with regard to systems 100 and 200.

In one aspect, a billing component 302 can be employed to manage billing relationships for devices communicating via the FAP 104. Although, the billing component 302 is shown to reside internally within the FAP 104, it can be appreciated that the billing component 302 can be externally connected to the FAP 104. Moreover, in one example, a common external billing component (not shown) can be utilized to facilitate billing management associated with multiple femto access points. In one aspect, the billing component 302 can analyze data from the monitoring component 112, such as, but not limited to, route employed by communication, duration of communication, amount of communication etc., to update an associated billing database (not shown). The billing database can be an internal database or an external database that can be locally or remotely located. Further, the billing database can be a relational database, object database, multidimensional database, or the like. In one aspect, the billing component 302 can dynamically update the billing database and/or aggregate billing information and update the billing database periodically, on demand, and/or when network is idle. The billing database can be accessed by the service provider to send the user and/or femto cell owner a periodic bill.

In accordance with an embodiment, the billing component 302 can charge and/or utilize a different billing rate based on the packet routing, for example, by the routing component 108. As an example, a lower rate can be charged for communications that are not routed via the backhaul network to the core mobile network. Moreover, the charges can be predefined by a service provider and/or operator and stored as one or more billing policies. In addition, the charges can also be dynamically modified based on available network bandwidth. In one aspect, the billing component 302 can calculate a charge associated with a communication through the FAP 104. In one example, the billing component can receive charge information from an Operations Support System (OSS) and/or Business Support System (BSS). Moreover, the billing component 302 can also provide billing information associated with each route taken by a communication, for example, a charge for the communication when the communication is directed through the core mobile network, and a charge when local breakout is performed and the communication is directed directly from the FAP 104, which can be utilized to determine an optimal route (e.g., low cost route). Accordingly, a cost-benefit analysis can be performed to select an optimal route based on the charge for network usage on each available route provided by the billing component 302. Alternately, a lowest cost route can be utilized for routing based on the information provided by the billing component 302.

Further, the billing component 302 can utilize amount of network usage during communication (e.g., observed by the monitoring component), for example, based on the amount of information sent/received to/from a particular UE, to update a billing record associated with the particular UE in the billing database with appropriate network connectivity charges. In one example, the billing component 302 can charge a rate "X" when packets are routed via the backhaul pipe to a core mobility network, a rate "Y" when packets are routed via a DH LAN to the Internet, and/or a rate "Z" when packets are routed locally to another device connected to the FAP 104, such that $Z \leq Y \leq X$. As an example, the charges "X", "Y" and/or "Z" can be predefined and/or can be dynamically computed by the billing component 302. In addition, the billing component 302 can utilize most any policy, for example set by a service provider to calculate the charges "X", "Y" and/or "Z". The policies can indicate offers, incentives, schemes and/or penalties that can be specified by the service provider.

Additionally or alternately, the FAP 104 can include a usage collection component 304 that can collect usage data from a UE, when the UE is attached to the FAP 104. As an example, a utility company meter (or most any device) can be equipped with a UE, such that, the meter can communicate with the macro network and/or the femto network (e.g., when the UE is authorized based in part on data from an access control list). Typically, when the meter (with attached UE) is within the femto coverage area, the FAP 104 can authorize the meter and facilitate attachment to the FAP 104. The usage collection component 304 can detect when the meter is attached to the FAP 104 and can periodically, on demand, based on bandwidth availability, and/or dynamically, collect usage data from the meter. The collected data can be sent to a respective utility company by utilizing most any local breakout mechanism. For example, the usage collection component 304 can transfer the collected data to a company server over the Internet, for example, via the LAN connected to the FAP 104. It can be appreciated that the meter can interface to the macro cell where coverage is good, by employing the UE, or can attach to the FAP 104 when available.

According to an aspect, the usage collection component 304 can receive and forward measurements to a utility company. For example, a water usage meter can be connected with a radio communications element (e.g., UE) that can facilitate the meter to communicate with the macro and/or femto network. When the meter is attached to the FAP 104, the usage collection component 304 can collect detailed measurements from the meter and forward them to the water company, via the Internet (or via the backhaul network). According to an aspect, the usage collection component 304 can also aggregate data from multiple UEs associated with a company and provide the aggregated data to the company for preparing a comprehensive bill. In one example, the usage collection component 304 can receive data from UEs specified by a user and/or femtocell owner, for example, in an access control list.

Figure 4:
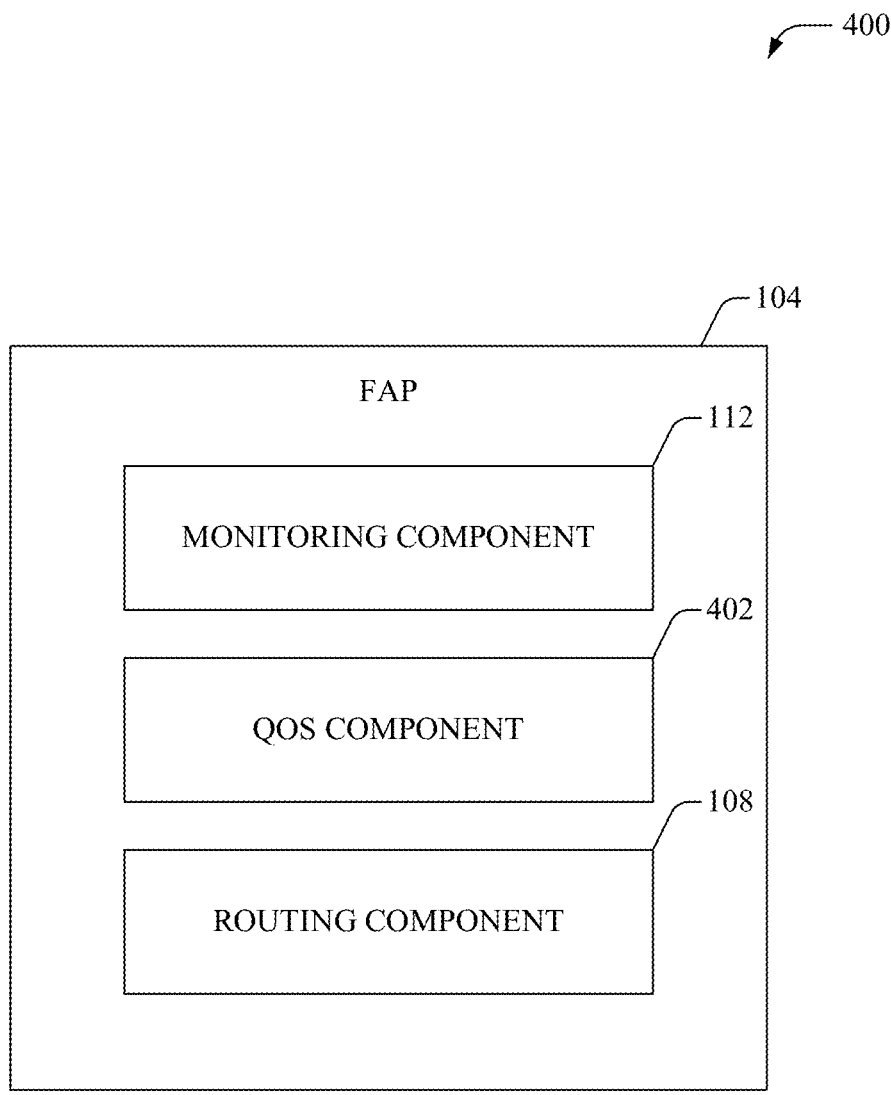
FIG. 4 illustrates an example system that facilitates Quality of Service (QoS) management associated with local breakout mechanisms at a FAP.

FIG. 4 illustrates an example system 400 that can facilitate Quality of Service (QoS) management associated with local breakout mechanisms at a femto access point 104, according to an aspect of the subject specification. It can be appreciated that the FAP 104, routing component 108, and monitoring component 112 can include functionality, as more fully described herein, for example, with regard to systems 100, 200 and 300. In one aspect, the FAP 104 can include a QoS component 402 that can facilitate resource reservation control mechanisms to provide different QoS for different communication.

In one example, the QoS component 402 can assign and/or provide different priority to different applications, UEs, and/or data flows, such that a predefined and/or dynamically generated level of performance can be guaranteed for a communication. The QoS component 402 can utilize a policy defined by a user and/or service provider, which specifies QoS parameters, such as, but not limited to, a required bit rate, delay, jitter, packet dropping probability and/or bit error rate to instruct the service provider network how to treat the service/application. Moreover, the QoS component 402 facilitates QoS management during real-time, streaming multimedia, and/or most any delay sensitive applications such as voice over Internet protocol (VoIP), games, streaming video, streaming audio, etc.

Typically, the traffic from a UE attached to the FAP 104, can be routed to the mobility core network by the FAP 104 by employing the broadband service serving the home (e.g., DH LAN 210). In one example, an IP Security (IPsec) tunnel can be established between the FAP 104 and the femto gateway (not shown), located at the edge of the mobility core network. Moreover, UE traffic to/from the mobility core network can be transported via the IPsec tunnel. As an example, the UE traffic can include, but is not limited to, voice, video, Internet application data. The QoS component 402 can facilitate providing different QoS for different traffic based on the type of UE data. In particular, the QoS component 402 can designate a different class of service, for example, to voice and video, to provide an acceptable quality of service to an end user. In one aspect, the QoS component 402 can facilitate mapping and/or translation of QoS classes when local breakout is performed at the FAP 104 (e.g., by the routing component 108). For example, the QoS component 402 can translate a UE generated class of service of UE packets, to a class known to the home router, such that the home router can serve the packets appropriately, when traffic is routed to a home network (e.g., DH LAN 210).

Figure 5:
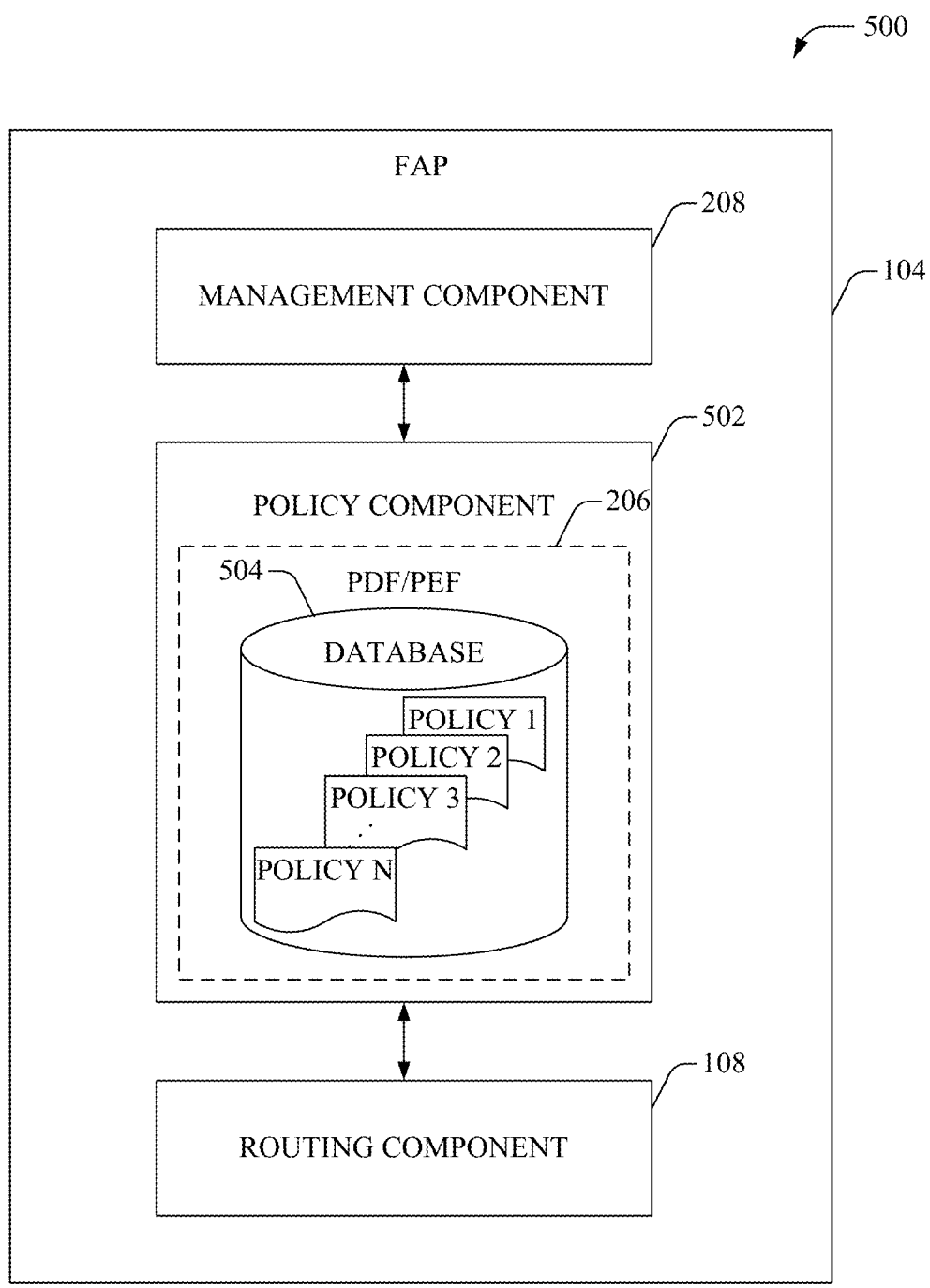
FIG. 5 illustrates an example system that can be employed for policy management in a FAP supporting femtocell local breakout.

Referring now to FIG. 5, there illustrated is an example system 500 that can be employed for policy management in a FAP 104 supporting femtocell local breakout, according to an aspect of the subject disclosure. Moreover, a policy functionality can be utilized in FAP 104 that can provide wide variety of traffic routing functions seeking maximized network cost efficiencies and/or business continuity services. It can be appreciated that the routing component 108, management component 208, PDF/PEF 206, and FAP 104 can include functionality, as more fully described herein, for example, with regard to system 100, 200, 300 and 400.

In one example, the FAP 104 can route traffic (e.g., by employing routing component 108) originating in the femtocell to other destinations within the same consumer domain (e.g., a DH LAN 210) and/or externally to another destination, and can ensure that the traffic is not sent in the secure tunnel (e.g., Iu) that routes that traffic to the core mobility network. Moreover, in one aspect, such routing can be based on a static configuration, for example, based on destination address, source address and/or an analysis of the traffic received at the FAP 104. In one example, the static configuration can be downloaded by the management component 208 from the service provider network by employing a TR-69 protocol. In one aspect, the management component 208 can provide an interface for the service provider network to transfer a configuration to the FAP 104, which can be stored in database 504. According to an aspect, database 504 can be most any database internal or external to the FAP 104. In one example, a static configuration can be downloaded during setup, installation, and/or provisioning of the FAP 104. However, it can be appreciated that the subject innovation is not so limited and the download can take place at most any time.

According to another aspect, the FAP 104 can include a policy component 502 that can appropriately identify for the FAP 104, a route for received traffic based on an analysis in view of one or more policies. In one aspect, policies 1-N (where N can be most any natural number from one to infinity) can be stored within the a database 504 of PDF/PEF 206. As an example, a policy (1-N) can define a route for traffic for each type of application. Moreover, the policy (1-N) can define that a certain type of application can be served by a wireline network (e.g., DH LAN 210) and a disparate type of application can be served by the core mobility network. For example, a peer-to-peer application can be better routed over the wireline (e.g., DH LAN 210) network to reduce delay. In one aspect, the policy component 502 can identify the type of application and determine the route based on definition in the policy (1-N).

In another aspect, the policy (1-N) can define different routes for received traffic based on availability of network resources. For example, the policy (1-N) can specify different routes associated with different levels of network utilization. In another example, the policy (1-N) can define different routes for when a network is not available, for example, during a scheduled network outage, upgrade, etc. Accordingly, policy component 502 can identify current network utilization, and/or current network outages and identify the route specified by the policy (1-N). Moreover, the routing component 108 can route the traffic based in part on a route identified by the policy component 502. Additionally or alternately, the policy (1-N) can provide different routes for different times in a day, day of week, etc. and/or location of the FAP 104, UE sending/receiving the traffic, etc. Further, the policy (1-N) can define routes for different authorized users and/or UEs.

Typically, the PDF can analyze policies 1-N, individually or collectively to identify a route that can be provided to the routing component 108 and the PEF can then execute that action. In one example, the policy component 502 can determine when one policy supersedes another policy and accordingly apply/enforce the appropriate policy and/or combination of policies. Further, the policy component 502, can determine billing information associated with the received traffic, for example, from the billing component (302, FIG. 3). A policy 1-N can indicate whether a low-cost and/or cost-benefit can be employed for the received traffic. In one example, when the policy specifies routing based on lowest cost, the policy component 502 can determine a route associated with the lowest cost to the user, by employing information from the billing component (302, FIG. 3). Alternately, when the policy determines a cost-benefit analysis to be utilized for routing, the policy component 502 can determine a route with the lowest cost such that reliability, including but not limited to QoS, is maintained. Further, a policy can also specify that route selection be based on avoiding congestion rather than cost.

Furthermore, the policy component 502 can communicate with other policy services, in the DH LAN, other business networks, and/or within the mobility network to facilitate optimal routing. As an example, an element (not shown) in the mobility network can communicate with the policy component 502 to provide data associated with various factors, such as, but not limited to, mobility network status, available bandwidth, traffic congestion, etc. Typically, the element can provide service provider related planned or present traffic conditions, which can be utilized by the policy component 502 to facilitate efficient routing at the FAP 104. Oftentimes, large amounts of traffic of a certain application can be generated such that, congestion can occur for the traffic for that QoS class associated with the application. Typically, the policy component 502 can avoid congestion by appropriately routing traffic based in part on load balancing for QoS classes.

The policies (1-N) in the database 504 can be dynamically created, updated and/or deleted by authorized personnel, for example, a service provider, authorized UE, FAP 104 owner, etc. As discussed supra, the service provider can communicate with the PDF/PEF, via an interface provided by the management component 208. Typically, the service provider can specify the policies (1-N) during setup or provisioning and can update the policies dynamically at most any time. Further, a subset of policies can be specified by a subscriber, such as, but not limited to, an authorized user, and/or the femtocell owner. The subscriber can create, modify and/or control a subset of policies in database 504. For example, the subscriber can specify preferences, such as, route using lowest cost, or route in a manner that business continuity is maintained regardless of cost incurred, etc. In one aspect, the policy component 502 can determine which policies can be applied to a particular communication, and which policies can be over-ridden. As an example, for similar, conflicting and/or overlapping traffic routing policies, the policy component 502 can assign a higher preference/priority to operator specified policies compared to subscriber specified policies and apply the appropriate operator specified policy for route determination.

In one example, policy component 502 can determine route based in part on real-time network bandwidth and/or configuration, such that, the mobility network can be employed as a fall back plan, after bandwidth on the wireline network (e.g., DH LAN) is utilized. In one aspect, the policy component 502 can also determine when wireline access network resources become available, and can facilitate re-routing mobility consumed resources to the wireline domain, based on new service initiation, and/or on the fly based on current sessions. It can be appreciated that the reverse scenario can also be performed by the policy component 502, wherein services can be transferred from the wireline domain to the mobile domain (e.g., DH LAN to core mobility network). According to an additional aspect, routing is not limited to a single mobility core network. It can be appreciated that a policy in the FAP 104 can specify routing of traffic to additional wireless spectrums from disparate service providers; if for example, business continuity is most important to the customer. In this example scenario, the billing charges associated with routing to a different service provider (e.g., disparate from the service provider of the FAP 104) can be greater than routing to the service provider of the FAP 104. However, if determined (e.g., by the policy component 502) that network resources of mobility network associated with the service provider of the FAP 104 are not available, the traffic can be routed via a disparate mobility network (not shown).

Figure 6:
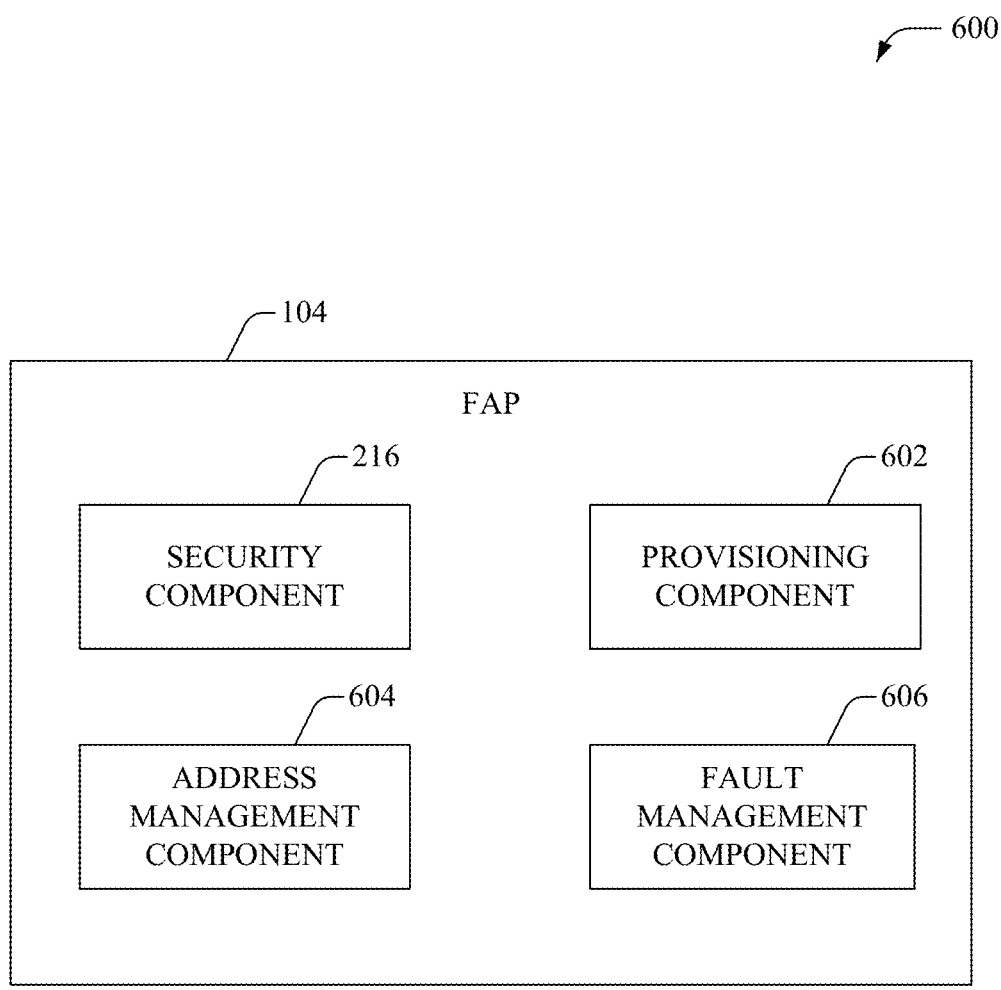
FIG. 6 illustrates an example system facilitates management services associated with local breakout at a FAP, according to an aspect of the subject disclosure.

FIG. 6 illustrates an example system 600 that facilitates breakout management services at a FAP 104 in accordance with an aspect of the subject innovation. Typically, the security component 216 and FAP 104 illustrated in system 600 can include functionality, as more fully described herein, for example, with regard to systems 100-500. As discussed above, the security component 216 facilitates security management within the FAP 104 and/or during traffic routing. Typically, security component 216 can facilitate authentication and/or authorization to prevent unauthorized attachments. For example, the security component 216 can manage access to femtocell services through access control list(s), e.g., white list(s) or black list(s). Such access control list(s) can be configured through various apparatuses and in various modes, e.g., interactively or automatically, which facilitates access management of access to femtocell coverage. As an example, white list(s) includes a set of UE(s) identifier numbers, codes or tokens, and can also include additional fields that can contain information respectively associated with communication devices to facilitate femtocell access management based at least in part on desired complexity; for example, an additional field in a white list can be a logic parameter that determines whether an associated identifier is available for dissemination across disparate white lists. Values of attribute fields that determine white list(s), black list(s), or white list profile(s) can be generated through various sources. As an example, the management component (208, FIG. 2) can facilitate generation and maintenance of white list(s), black list(s), or white list profile(s).

Further, the security component 216 can be employed to designate administrative privileges to a set of UEs. The security component 216 can verify authorization to administrative functions to ensure only the set of UEs can access the functions. Furthermore, the security component 216 can be utilized to facilitate intrusion detection/prevention and/or for protecting the DH LAN 210 and prohibiting bridging of the DH LAN 210 with the Internet through the mobility core network. Moreover, the security component 216 can encrypt traffic to the core mobility network to create the Iu tunnel, by employing most any encryption technique. In addition, the security component 216 can decrypt traffic received at the FAP via the Iu tunnel. In one aspect, wireline communication, for example via the DH LAN, can also be encrypted/decrypted by the security component 216.

In one aspect, a provisioning component 602 can be utilized to facilitate configuration of the FAP 104 during initial setup, for example, when the femto owner installs the FAP 104. Moreover, the provisioning component 602 can facilitate authentication of the FAP 104 with the mobility network and/or the DH LAN. Further, provisioning component 602 can communicate with the mobility network and/or femto owner to download setup information, including but not limited to one or more policies in PDF/PEF (206, FIG. 2). Furthermore, the provisioning component 602 provides information to the mobility network indicating local breakout at the femtocell. Accordingly, the service provider is aware that traffic that would otherwise be routed through the mobility network, can now be routed to a wireline network (e.g., DH LAN), and vice versa, and traffic sourced at a device/application/service on the wireline network can be routed to the mobile domain, unless its destination is not in a mobile network.

According to an embodiment, the FAP 104 can further include an address management component 604 that can store mapping information that facilitates network address translation during femtocell breakout, for example, by the NAT/firewall component (212, FIG. 2). Additionally or alternately, the FAP 104 can include a fault management component 606 that can facilitate fault detection, diagnosis and/or repair during local breakout at the FAP 104. In particular, the fault management component 606 can monitor and/or detect a fault condition during local breakout. For example, the fault condition can include, but is not limited to, slave GGSN routing failure, DNS failure, optimal routing failure, policy-based routing failure, etc. In one example, if a call from a UE, attached to the FAP, is dropped more than a predefined number of times during local breakout at the FAP, the fault management component 606 can send an alarm notification to the service provider over the mobility network. It can be appreciated that enforcement of one or more policies can facilitate fault detection. In addition, the fault management component 606 can also diagnose a problem and send only diagnosed information to the service provider. Further, the fault management component 606 can log information (e.g., by storing in most any database), such as but not limited to, system status, source of traffic, destination of traffic, etc. when a fault is detected. The logged information can also be sent to the service provider (e.g., by the fault management component 606). Furthermore, the fault management component 606 can provide an interface that can enable an entity (e.g., network operator, service provider, etc.) to remotely repair the detected faults. Moreover, a network operator can login and provide software updates to repair the detected fault remotely. In one aspect, the faults detected and/or the repairs made can be logged in a data store (not shown) within the FAP, locally connected to the FAP, or remotely connected to the FAP.

Figure 7:
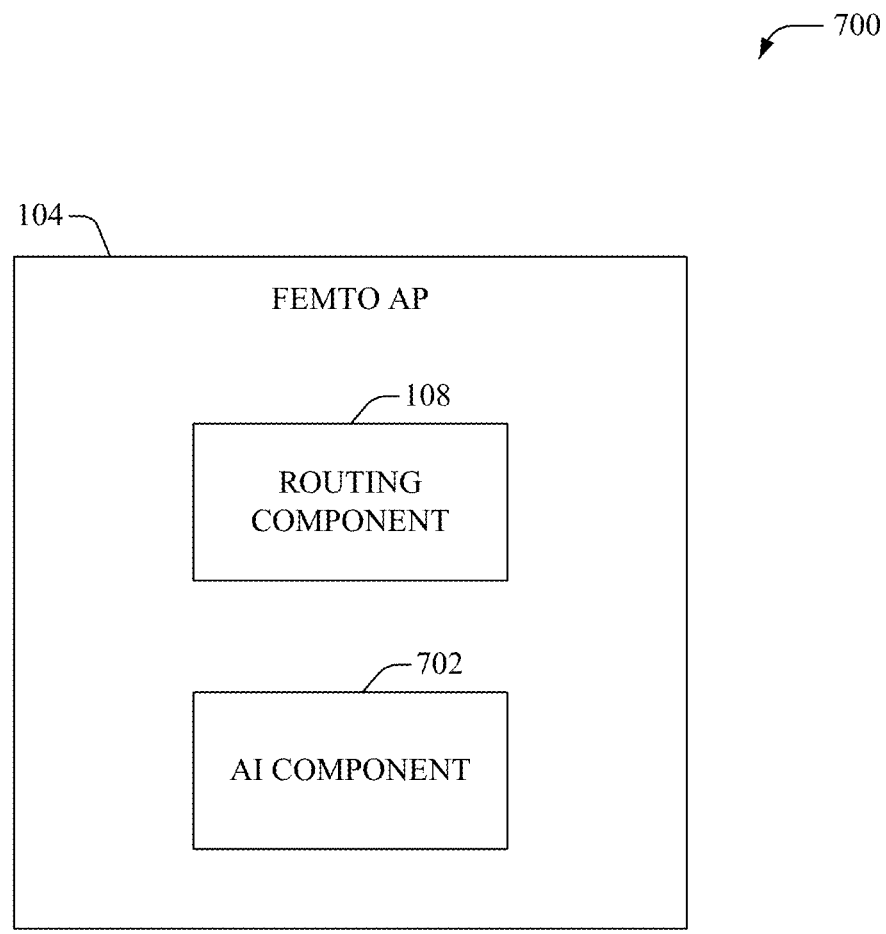
FIG. 7 illustrates an example system that facilitates automating one or more features in accordance with the subject innovation.

FIG. 7 illustrates an example system 700 that employs an artificial intelligence (AI) component 702, which facilitates automating one or more features in accordance with the subject innovation. It can be appreciated that the FAP 104 and the routing component 108 can include respective functionality, as more fully described herein, for example, with regard to systems 100-600.

The subject innovation (e.g., in connection with billing, QoS, routing, policy selecting, etc.) can employ various AI-based schemes for carrying out various aspects thereof. For example, a process for which policies to utilize by the policy component 502 and/or a process for designation of application of QoS for a communication can be facilitated, via an automatic classifier system and process. Moreover, where the routing component 108 can facilitate local breakout at the FAP 104, the classifier can be employed to determine management of services, such as but not limited to, billing, QoS, etc., associated with routing of the received traffic.

A classifier is a function that maps an input attribute vector, $x=(x1, x2, x3, x4, xn)$, to a confidence that the input belongs to a class, that is, $f(x)=\text{confidence}(\text{class})$. Such classification can employ a probabilistic and/or statistical-based analysis (e.g., factoring into the analysis utilities and costs) to prognose or infer an action that a user desires to be automatically performed. In the case of communication systems, for example, attributes can be information within the packet headers or other data-specific attributes derived from the information within the packet headers, and the classes can be categories or areas of interest (e.g., levels of priorities).

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVMs are configured via a learning or training phase within a classifier constructor and feature selection module. Thus, the classifier(s) can be used to automatically learn and perform a number of functions, including but not limited to determining according to a predetermined criteria one or more policies that can be utilized for traffic routing, routing of traffic associated with different types of services to improve overall quality of service perceived by the end user, etc. The criteria can include, but is not limited to, the amount of traffic received, the type of traffic received, the importance (e.g., priority) of the traffic received, historical patterns, UE behavior, user preferences, service provider preferences and/or policies, FAP parameters, etc.

FIGS. 8-11 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 8:
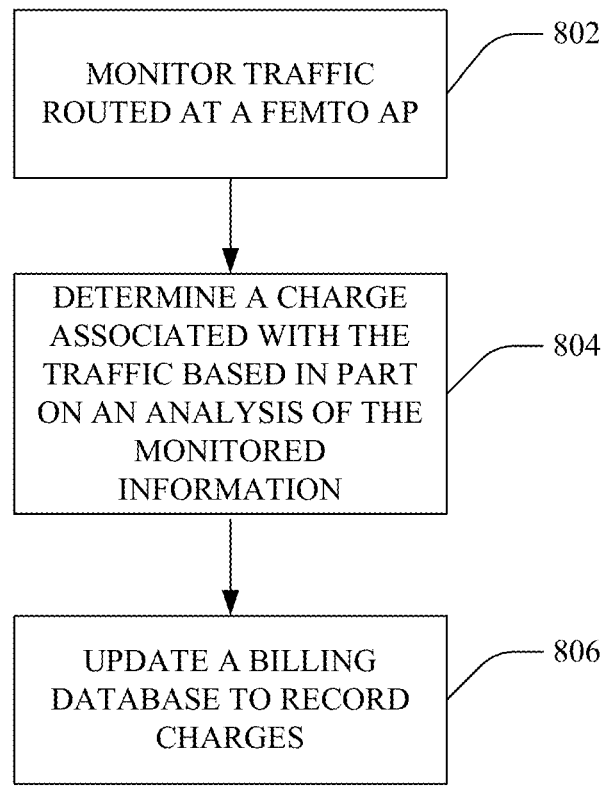
FIG. 8 illustrates an example methodology that can facilitate a billing scheme based in part on local breakout at a FAP.

Referring now to FIG. 8, illustrated is an example methodology 800 that can facilitate a billing scheme based in part on local breakout at a FAP, according to an aspect of the subject disclosure. Moreover, to reduce congestion in the core network and utilization of core network resources, local breakout can be performed at a FAP connected to a wireline network, such as, but not limited to a DH LAN. In one example, to provide an incentive to minimize utilization of core network resources, a service provider can utilize a billing scheme that charges lower rates when local breakout is performed at the FAP.

At 802, traffic routed at the FAP can be monitored. As an example, the monitoring can include, but is not limited to, identifying a route employed by traffic duration of traffic, amount of traffic, type of traffic, etc. At 804, a charge associated with the traffic can be determined, based in part on an analysis of the monitored information. For example, a list of charges for various scenarios (e.g., charge for routing via core mobility network, charge for routing via wireline network, charge associated with amount of traffic, etc.) can be predefined and stored in a database (e.g., as a policy), and/or can be dynamically calculated. As an example, a higher rate can be charged for traffic routed via the backhaul network to the core mobile network. In addition, the charges can also be dynamically modified based on available network bandwidth in a manner to facilitate load balancing and reduce network congestion.

At 806, a billing database can be appropriately updated to record charges for the traffic. Moreover, the service provider can utilize information from the billing database to provide each subscriber with a periodic bill. As an example, the billing database can be updated periodically, on demand, and/or dynamically. In one aspect, billing data can be aggregated and the billing database can be updated periodically, on demand, when network is idle, etc.

Figure 9:
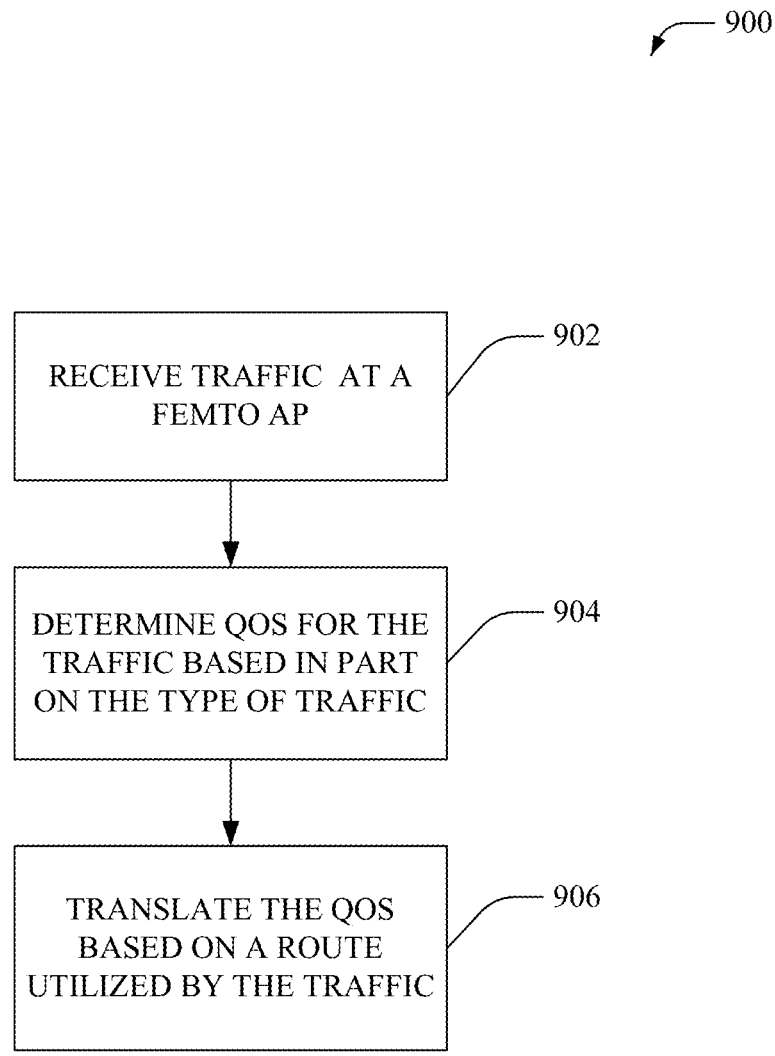
FIG. 9 illustrates an example methodology that facilitates QoS management at a FAP that supports local breakout.

FIG. 9 illustrates an example methodology 900 that facilitates QoS management at a FAP that supports local breakout in accordance with an aspect of the subject specification. Moreover, the FAP can perform a resource reservation control mechanism to provide different QoS for different traffic received at and routed by the FAP. Typically, different QoS classes can be employed to guarantee a particular level of performance for the traffic. As an example, a QoS class can specify various parameters, such as, but not limited to, required bit rate, delay, jitter, packet dropping probability, bit error rate, etc.

At 902, traffic can be received at the FAP. For example, traffic can be received from a UE attached to the FAP, from a device, service, or application on a wireline network connected to the FAP and/or from the core mobility network. At 904, the QoS for the traffic can be determined based in part on the type of the traffic, for example, streaming, non-real time, VoIP, etc. At 906, the QoS can be translated and/or mapped, based on a route utilized by the traffic. In one example, when traffic received from the UE, is routed over the wireline network, for example, a home network, a UE generated QoS class of service of UE packets to the IPsec tunnel can be translated to a QoS class known to the home router, such that the home router can serve the packets appropriately.

Figure 10:
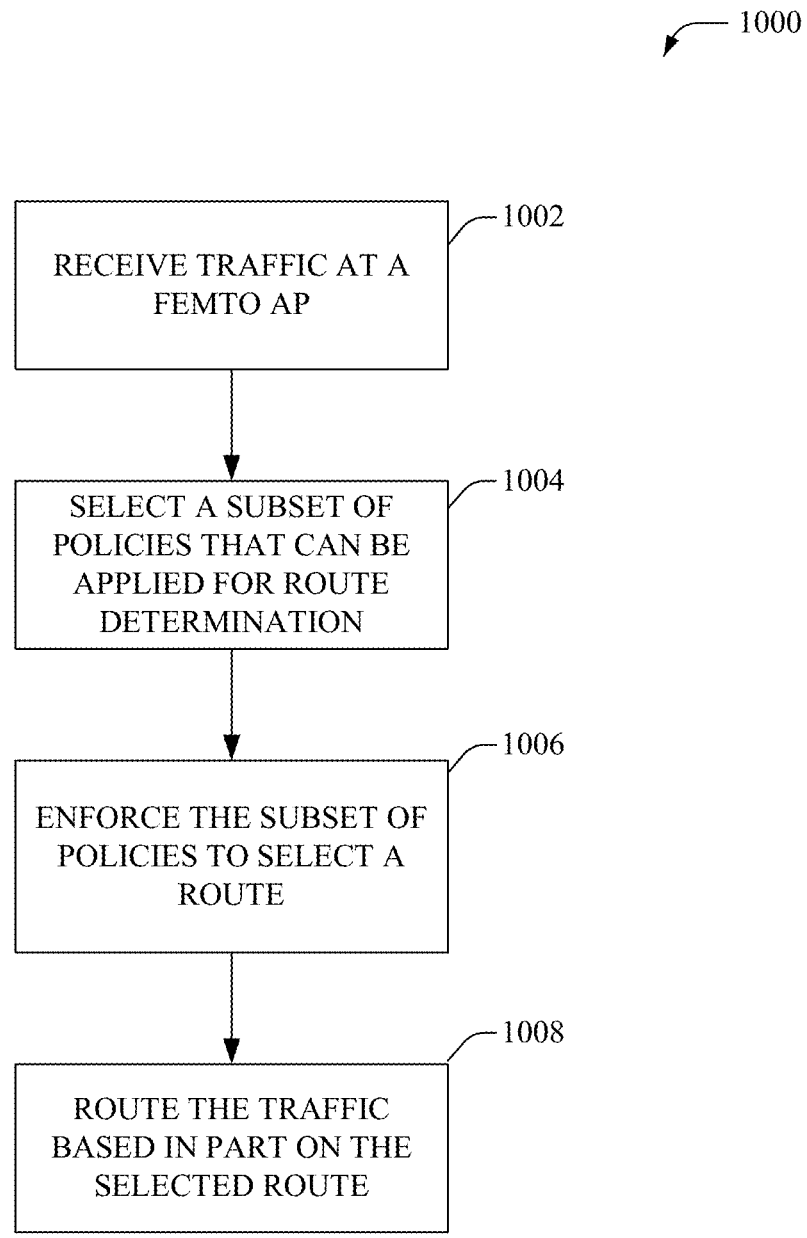
FIG. 10 illustrates an example methodology that facilitates dynamic routing at a FAP by utilizing one or more routing policies.

FIG. 10 illustrates an example methodology 1000 that facilitates dynamic routing at a FAP by utilizing one or more routing policies. At 1002, traffic can be received at the FAP. In one aspect, the received traffic can be sourced at a UE attached to the FAP, a device, service, application on a wireline network connected to the FAP, and/or the core mobility network. Typically, the traffic can be routed based on an analysis of the traffic, for example, destination address and local breakout can be performed based on a static configuration. Additionally, the methodology 1000 can be utilized to provide routing based in part on a set of user-defined and/or service provider defined policies that can facilitate decision making during routing.

At 1004, a subset of policies can be selected that can be applied for route determination. For example, not all policies may be applicable to the received traffic. Further, certain polices can be similar, conflicting and/or overlapping and accordingly a subset of applicable policies can be selected. At 1006, the selected subset of policies can be enforced, for example, individually or collectively, to select a route. Moreover, the received traffic can also be analyzed against the policies. The policies can indicate a route based on various factors, such as, but not limited to, type of traffic, current and/or future network resource availability, current time, day and/or date, location of the FAP, location of a UE sending/receiving the traffic, a lowest cost, and/or cost-benefit, etc. Additionally, an analysis can be performed, which can include input from the DH LAN, other business networks, and/or within the mobility network to facilitate optimal routing. For example, data associated with mobility and/or wireline network status, planned outages, available bandwidth, traffic congestion, QoS, etc. can be utilized during analysis. At 1008, the traffic can be routed based in part on the route selected by the analysis of the policies.

Figure 11:
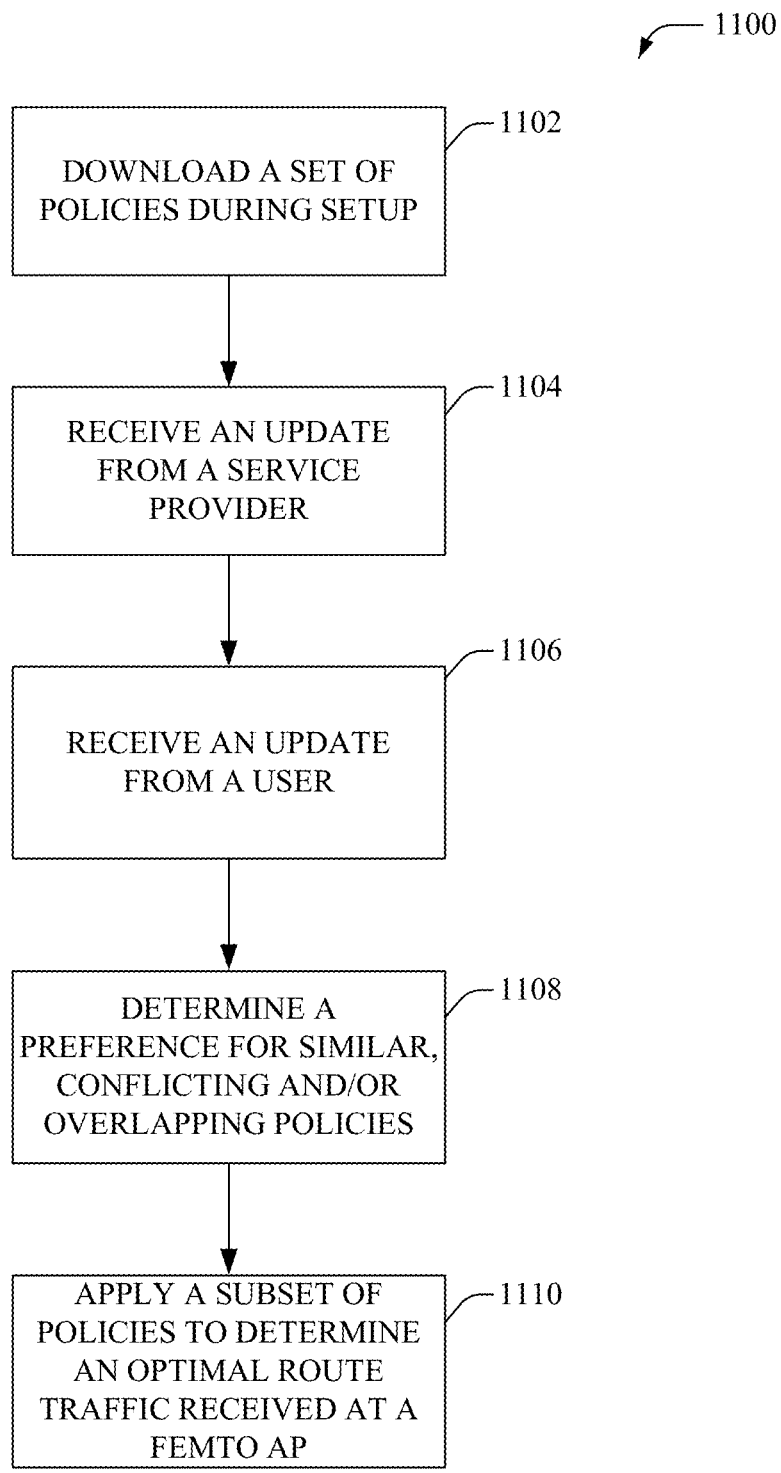
FIG. 11 illustrates an example methodology that facilitates policy management during local breakout at a FAP, according to an aspect of the subject disclosure.

Referring to FIG. 11, there illustrated is an example methodology 1100 that facilitates policy management during local breakout at a FAP, according to an aspect of the subject innovation. At 1102, a set of policies can be downloaded during setup. As an example, a configuration including one or more routing policies can be received, for example, from a service provider network, during a setup procedure when a FAP is installed.

Further, at 1104, an update can be received from a service provider, via the core network. For example, an interface can be provided that can enable a service provider and/or network operator to remotely create, delete or modify one or more policies. At 1106, an update can be received from a user, for example, an authorized user or femtocell owner. The update can be received, for example, remotely via a UE attached to the FAP or directly via an interface at the FAP, or most any other manner, and can include a modification, deletion or creation of one or more policies. In one example, the subscriber can specify preferences, such as, route using lowest cost, or route in a manner that business continuity is maintained regardless of cost incurred, etc. Such modification can require a billing policy and associated updates to the service profile. At 1108, a preference for similar, conflicting and/or overlapping policies can be determined, such that a subset of policies that can be applied to communication received at the FAP can be identified. Further, at 1110, the subset of policies can be applied to determine an optimal route for traffic received at the FAP.

Figure 12:
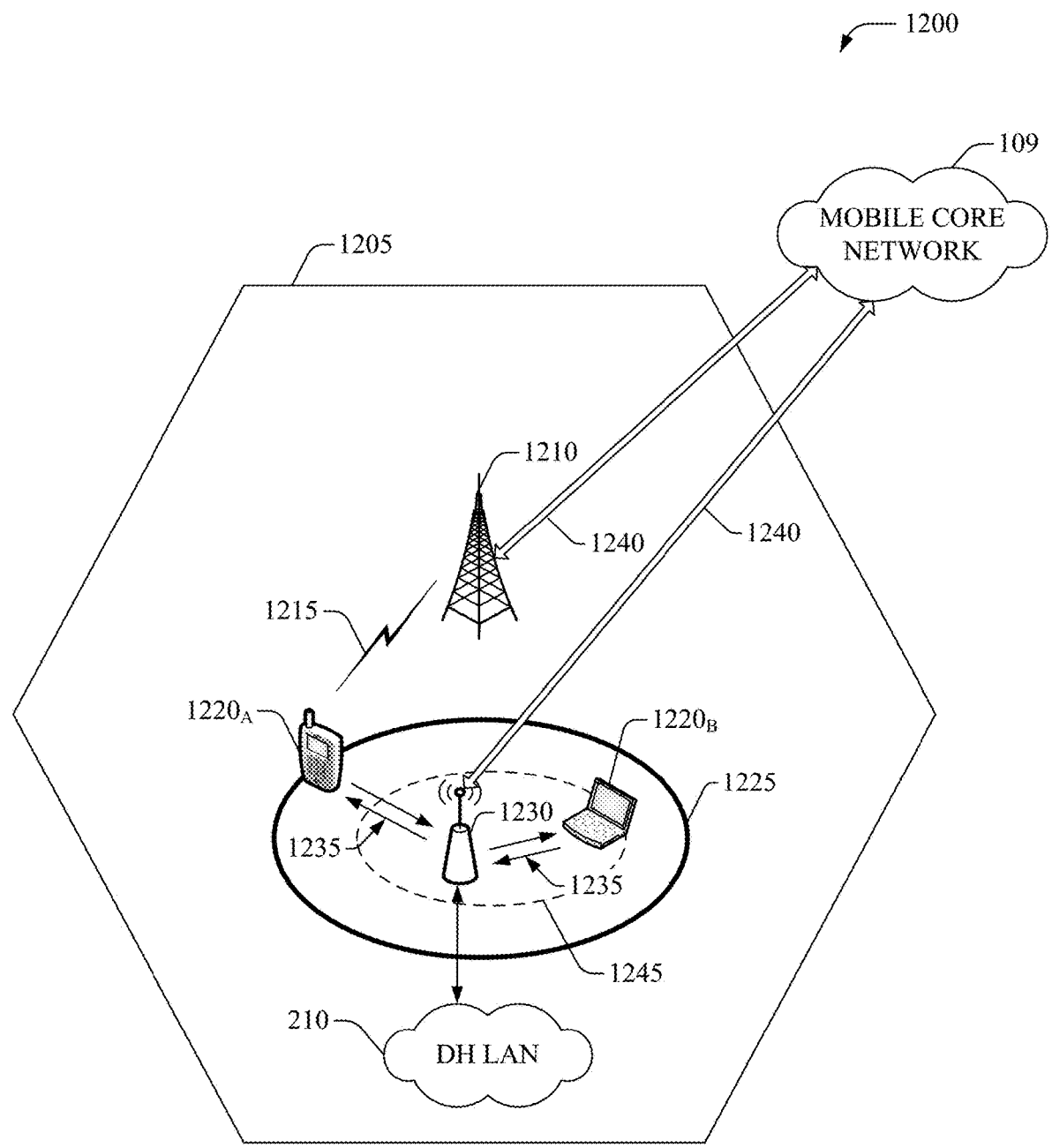
FIG. 12 illustrates an example wireless communication environment with associated components for operation of a femtocell in accordance with the subject specification.

FIG. 12 illustrates a schematic wireless environment 1200 (e.g., a network) in which a femtocell can exploit various aspects of the subject innovation in accordance with the disclosed subject matter. In wireless environment 1200, area 1205 can represent a coverage macro cell, which can be served by base station 1210. Macro coverage is generally intended for outdoors locations for servicing mobile wireless devices, like UE 1220$_A$, and such coverage is achieved via a wireless link 1215. In an aspect, UE 1220$_A$ can be a 3GPP Universal Mobile Telecommunication System (UMTS) mobile phone.

Within macro coverage cell 1205, a femtocell 1245, served by a femto access point 1230, can be deployed. A femtocell typically can cover an area 1225 that is determined, at least in part, by transmission power allocated to FAP 1230, path loss, shadowing, and so forth. Coverage area typically can be spanned by a coverage radius that ranges from 20 to 50 meters. Confined coverage area 1245 is generally associated with an indoors area, or a building, which can span about 5000 sq. ft. Generally, FAP 1230 typically can service a number (e.g., a few or more) wireless devices (e.g., subscriber station 1220$_B$) within confined coverage area 1245. In an aspect, FAP 1230 can integrate seamlessly with substantially any PS-based and CS-based network; for instance, FAP 1230 can integrate into an existing 3GPP Core via conventional interfaces like Iu-CS, Iu-PS, Gi, Gn. In another aspect, FAP 1230 can exploit high-speed downlink packet access in order to accomplish substantive bitrates. In yet another aspect, FAP 1230 has a LAC (location area code) and RAC (routing area code) that can be different from the underlying macro network. These LAC and RAC are used to identify subscriber station location for a variety of reasons, most notably to direct incoming voice and data traffic to appropriate paging transmitters.

As a subscriber station, e.g., UE 1220$_A$ and enters femto coverage (e.g., area 1215), as illustrated in environment 1200, UE 1220$_A$ can attempt to attach to the FAP 1230 through transmission and reception of attachment signaling, effected via a FURL 1235; in an aspect, the attachment signaling can include a Location Area Update (LAU) and/or Routing Area Update (RAU). Attachment attempts are a part of procedures to ensure mobility, so voice calls and sessions can continue even after a macro-to-femto transition or vice versa. It is to be noted that UE 1220$_A$ can be employed seamlessly after either of the foregoing transitions. Femto networks are also designed to serve stationary or slow-moving traffic with reduced signaling loads compared to macro networks. A femto service provider (e.g., an entity that commercializes, deploys, and/or utilizes FAP 1230) therefore can be inclined to minimize unnecessary LAU/RAU signaling activity at substantially any opportunity to do so, and through substantially any available means. It is to be noted that substantially any mitigation of unnecessary attachment signaling/control can be advantageous for femtocell operation. Conversely, if not successful, UE 1220$_A$ generally can be commanded (through a variety of communication means) to select another LAC/RAC or enter "emergency calls only" mode. It is to be appreciated that this attempt and handling process can occupy significant UE battery, and FAP capacity and signaling resources as well.

When an attachment attempt to FAP 1230 is successful, UE 1220$_A$ can be allowed on femtocell 1225 and incoming voice and data traffic can be paged and routed to the subscriber station through the FAP 1230. It is to be noted also that data traffic is typically routed through a backhaul 1240 (e.g., optical fiber backbone, twisted-pair line, T1/E1 phone line, DSL, or coaxial cable). It is to be noted that as a FAP 1230 generally can rely on a backhaul network backbone 1240 for routing, signaling and paging, and for packet communication. Namely, packet flows established for wireless communication devices (e.g., terminals 1220$_A$ and 1220$_B$) served by FAP 1230, and for devices served through the backhaul network pipe 1240. It is to be noted that to ensure a positive subscriber experience, or perception, it is desirable for FAP 1230 to maintain a high level of throughput for traffic (e.g., voice and data) utilized on a mobile device for one or more subscribers while in the presence of external, additional packetized, or broadband, traffic associated with applications (e.g., web browsing, data transfer (e.g., content upload), and the like) executed in devices within the femto coverage area (e.g., area 1225 or area 1245).

It can be appreciated that the FAP 1230 can be substantially similar to FAP 104 and include functionality, more fully described herein, for example, with respect to systems 100-700. In particular, FAP 1230 can include a routing component 108 that can utilize one or more local breakout mechanisms to facilitate efficient routing of traffic, for example, between UE (1220$_A$ and 1220$_B$), DH LAN 210, and/or mobile core network 109 (via backhaul broadband wired network backbone 1240).

Figure 13:
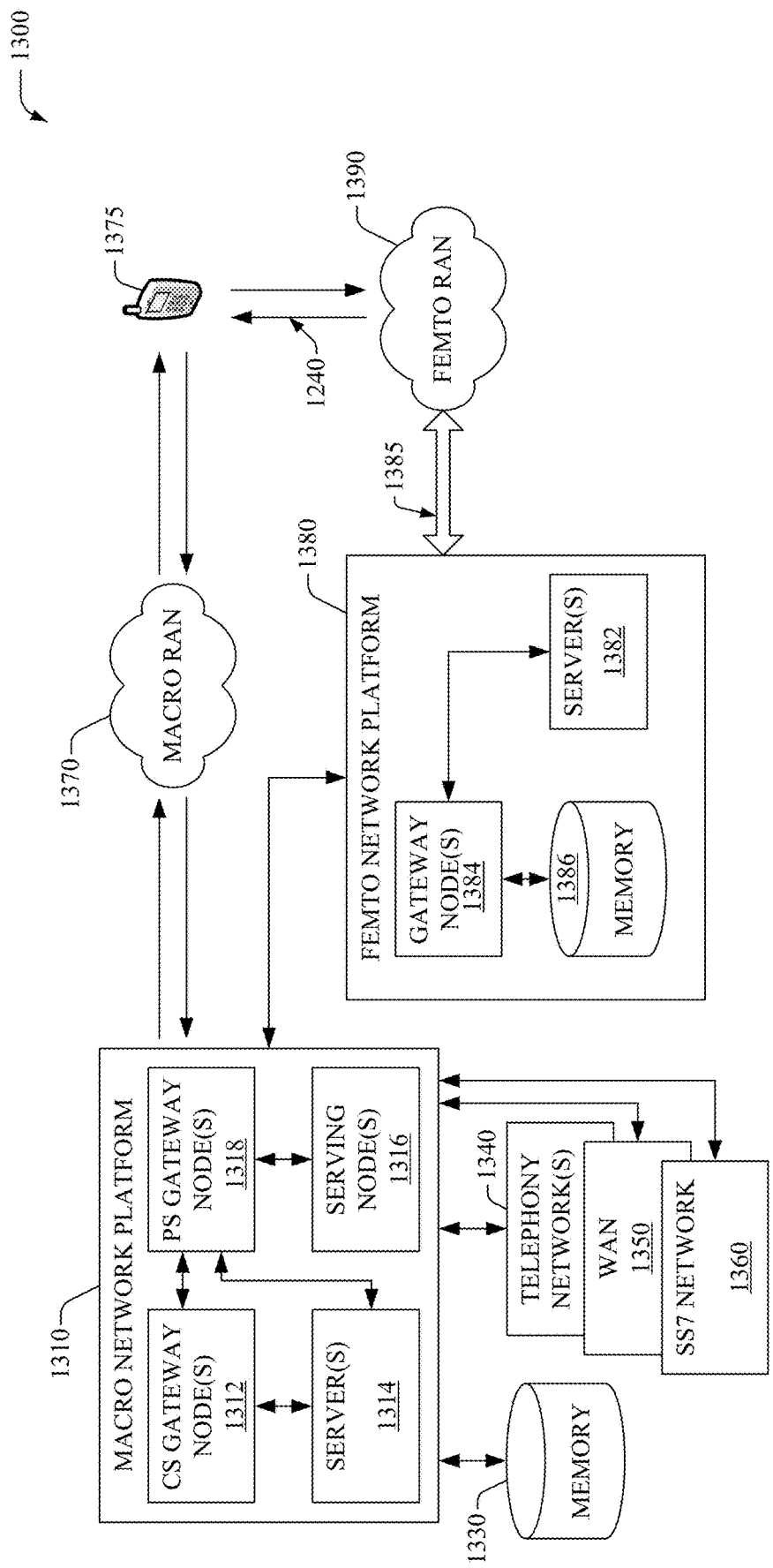
FIG. 13 illustrates a schematic deployment of a macro cell and a femtocell for wireless coverage in accordance with aspects of the disclosure.
Figure 14:
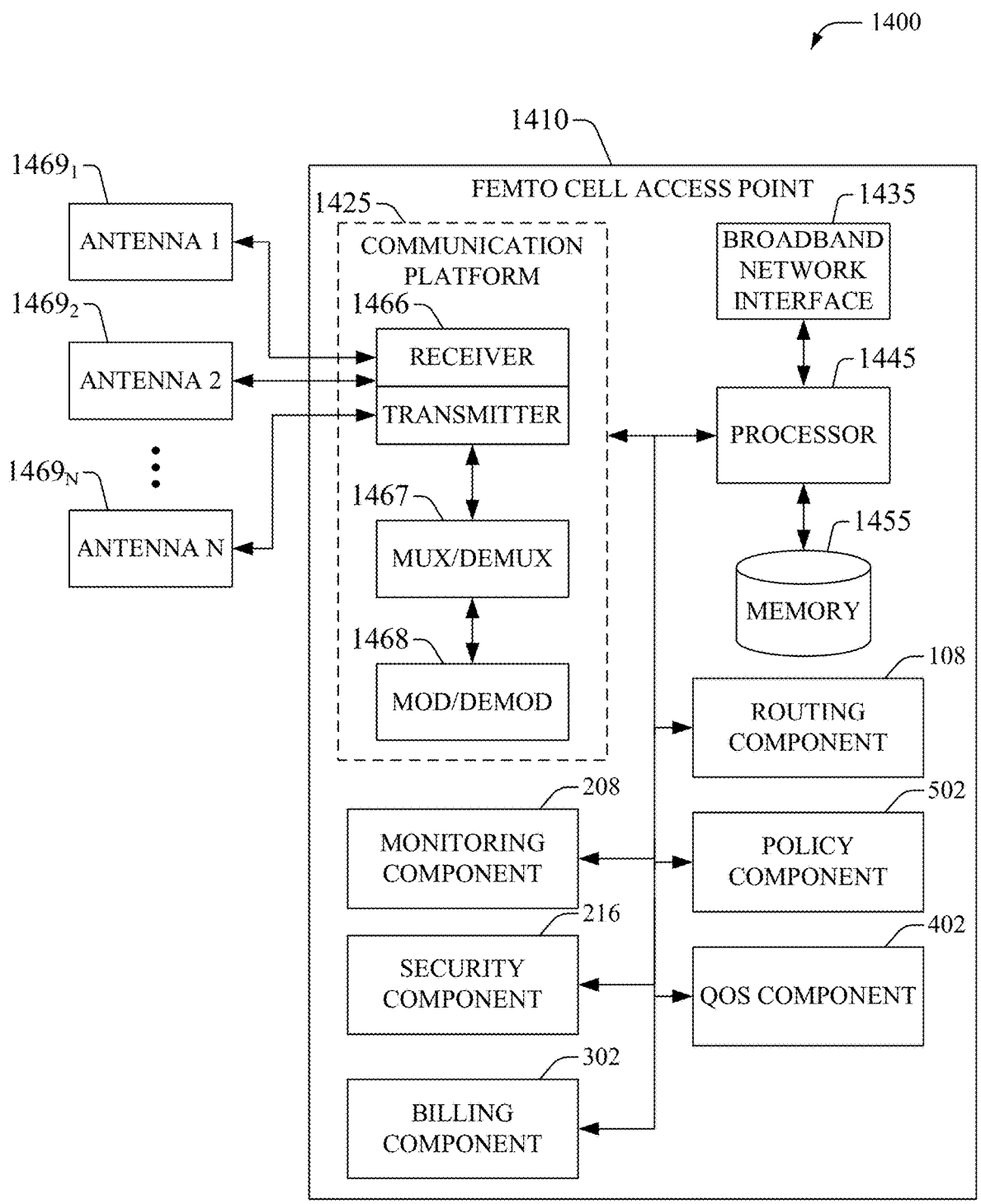
FIG. 14 illustrates an example embodiment of a femto access point that can facilitate local breakout, according to the subject disclosure.

To provide further context for various aspects of the subject specification, FIGS. 13 and 14 illustrate, respectively, an example wireless communication environment 1300, with associated components for operation of a femtocell, and a block diagram of an example embodiment 1400 of a femto access point, which can facilitate local breakout at a femtocell in accordance with aspects described herein.

Wireless communication environment 1300 includes two wireless network platforms: (i) A macro network platform 1310 that serves, or facilitates communication) with user equipment 1375 via a macro radio access network (RAN) 1370. It should be appreciated that in cellular wireless technologies (e.g., 3GPP UMTS, HSPA, 3GPP LTE, 3GPP UMB), macro network platform 1310 is embodied in a Core Network. (ii) A femto network platform 1380, which can provide communication with UE 1375 through a femto RAN 1390 linked to the femto network platform 1380 via backhaul pipe(s) 1385, wherein backhaul pipe(s) are substantially the same a backhaul link 1240. It should be appreciated that femto network platform 1380 typically offloads UE 1375 from macro network, once UE 1375 attaches (e.g., through macro-to-femto handover, or via a scan of channel resources in idle mode) to femto RAN.

It is noted that RAN includes base station(s), or access point(s), and its associated electronic circuitry and deployment site(s), in addition to a wireless radio link operated in accordance with the base station(s). Accordingly, macro RAN 1370 can comprise various coverage cells like cell 1205, while femto RAN 1390 can comprise multiple femtocell access points. As mentioned above, it is to be appreciated that deployment density in femto RAN 1390 is substantially higher than in macro RAN 1370.

Generally, both macro and femto network platforms 1310 and 1380 can include components, e.g., nodes, gateways, interfaces, servers, or platforms, that facilitate both packet-switched (PS) and circuit-switched (CS) traffic (e.g., voice and data) and control generation for networked wireless communication. For example, macro network platform 1310 includes CS gateway node(s) 1312 which can interface CS traffic received from legacy networks like telephony network(s) 1340 (e.g., public switched telephone network (PSTN), or public land mobile network (PLMN)) or a SS7 network 1360. Moreover, CS gateway node(s) 1312 interfaces CS-based traffic and signaling and gateway node(s) 1318.

In addition to receiving and processing CS-switched traffic and signaling, gateway node(s) 1318 can authorize and authenticate PS-based data sessions with served (e.g., through macro RAN) wireless devices. Data sessions can include traffic exchange with networks external to the macro network platform 1310, like wide area network(s) (WANs) 1350; it should be appreciated that local area network(s) (LANs) can also be interfaced with macro network platform 1310 through PS gateway node(s) 1318. Gateway node(s) 1318 generates packet data contexts when a data session is established. It should be further appreciated that the packetized communication can include multiple flows that can be generated through server(s) 1314. Macro network platform 1310 also includes serving node(s) 1316 that convey the various packetized flows of information, or data streams, received through gateway node(s) 1318. It is to be noted that server(s) 1314 can include one or more processor configured to confer at least in part the functionality of macro network platform 1310. To that end, the one or more processor can execute code instructions stored in memory 1330, for example.

In example wireless environment 1300, memory 1330 stores information related to operation of macro network platform 1310. Information can include business data associated with subscribers; market plans and strategies, e.g., promotional campaigns, business partnerships; operational data for mobile devices served through macro network platform; service and privacy policies; end-user service logs for law enforcement; and so forth. Memory 1330 can also store information from at least one of telephony network(s) 1340, WAN(s) 1350, or SS7 network 1360.

Femto gateway node(s) 1384 have substantially the same functionality as PS gateway node(s) 1318. Additionally, femto gateway node(s) 1384 can also include substantially all functionality of serving node(s) 1316. In an aspect, femto gateway node(s) 1384 facilitates handover resolution, e.g., assessment and execution. Server(s) 1382 have substantially the same functionality as described in connection with server(s) 1314 and can include one or more processors configured to confer at least in part the functionality of macro network platform 1310. To that end, the one or more processor can execute code instructions stored in memory 1386, for example.

Memory 1386 can include information relevant to operation of the various components of femto network platform 1380. For example operational information that can be stored in memory 1386 can comprise, but is not limited to, subscriber information; contracted services; maintenance and service records; femtocell configuration (e.g., devices served through femto RAN 1390; access control lists, or white lists); service policies and specifications; privacy policies; add-on features; and so forth With respect to FIG. 14, in example embodiment 1400, femtocell AP 1410 can receive and transmit signal(s) (e.g., traffic and control signals) from and to wireless devices, access terminals, wireless ports and routers, etc., through a set of antennas $1469_1$-$1469_N$. It should be appreciated that while antennas $1469_1$-$1469_N$ are a part of communication platform 1425, which comprises electronic components and associated circuitry that provides for processing and manipulating of received signal(s) (e.g., a packet flow) and signal(s) (e.g., a broadcast control channel) to be transmitted. In an aspect, communication platform 1425 includes a transmitter/receiver (e.g., a transceiver) 1466 that can convert signal(s) from analog format to digital format upon reception, and from digital format to analog format upon transmission. In addition, receiver/transmitter 1466 can divide a single data stream into multiple, parallel data streams, or perform the reciprocal operation. Coupled to transceiver 1466 is a multiplexer/demultiplexer 1467 that facilitates manipulation of signal in time and frequency space. Electronic component 1467 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1467 can scramble and spread information (e.g., codes) according to substantially any code known in the art; e.g., Hadamard-Walsh codes, Baker codes, Kasami codes, polyphase codes, and so on. A modulator/demodulator 1468 is also a part of operational group 1425, and can modulate information according to multiple modulation techniques, such as frequency modulation, amplitude modulation (e.g., M-ary quadrature amplitude modulation (QAM), with M a positive integer), phase-shift keying (PSK), and the like.

Femto access point 1410 also includes a processor 1445 configured to confer functionality, at least partially, to substantially any electronic component in the femto access point 1410, in accordance with aspects of the subject innovation. In particular, processor 1445 can facilitate FAP 1410 to implement configuration instructions received through communication platform 1425, which can include storing data in memory 1455. In addition, processor 1445 facilitates FAP 1410 to process data (e.g., symbols, bits, or chips) for multiplexing/demultiplexing, such as effecting direct and inverse fast Fourier transforms, selection of modulation rates, selection of data packet formats, inter-packet times, etc. Moreover, processor 1445 can manipulate antennas 1469$_1$-1469$_N$ to facilitate beamforming or selective radiation pattern formation, which can benefit specific locations (e.g., basement, home office . . . ), covered by FAP; and exploit substantially any other advantages associated with smart-antenna technology. Memory 1455 can store data structures, code instructions, system or device information like device identification codes (e.g., IMEI, IMSI, MSISDN, serial number . . . ) and specification such as multimode capabilities; code sequences for scrambling; spreading and pilot transmission, floor plan configuration, access point deployment and frequency plans; and so on. Moreover, memory 1455 can store configuration information such as schedules and policies; FAP address(es) or geographical indicator(s); access lists (e.g., white lists); license(s) for utilization of add-features for FAP 1410, and so forth.

In embodiment 1400, processor 1445 is coupled to the memory 1455 in order to store and retrieve information necessary to operate and/or confer functionality to communication platform 1425, broadband network interface 1335 (e.g., a broadband modem), and other operational components (e.g., multimode chipset(s), power supply sources . . . ; not shown) that support femto access point 1410. The FAP 1410 can further include a routing component 108, management component 208, security component 216, billing component 302, QoS component 302, policy component 502, etc., which can include functionality, as more fully described herein, for example, with regard to systems 100-500. In addition, it is to be noted that the various aspects disclosed in the subject specification can also be implemented through (i) program modules stored in a computer-readable storage medium or memory (e.g., memory 1386 or memory 1455) and executed by a processor (e.g., processor 1445), or (ii) other combination(s) of hardware and software, or hardware and firmware.

Figure 15:
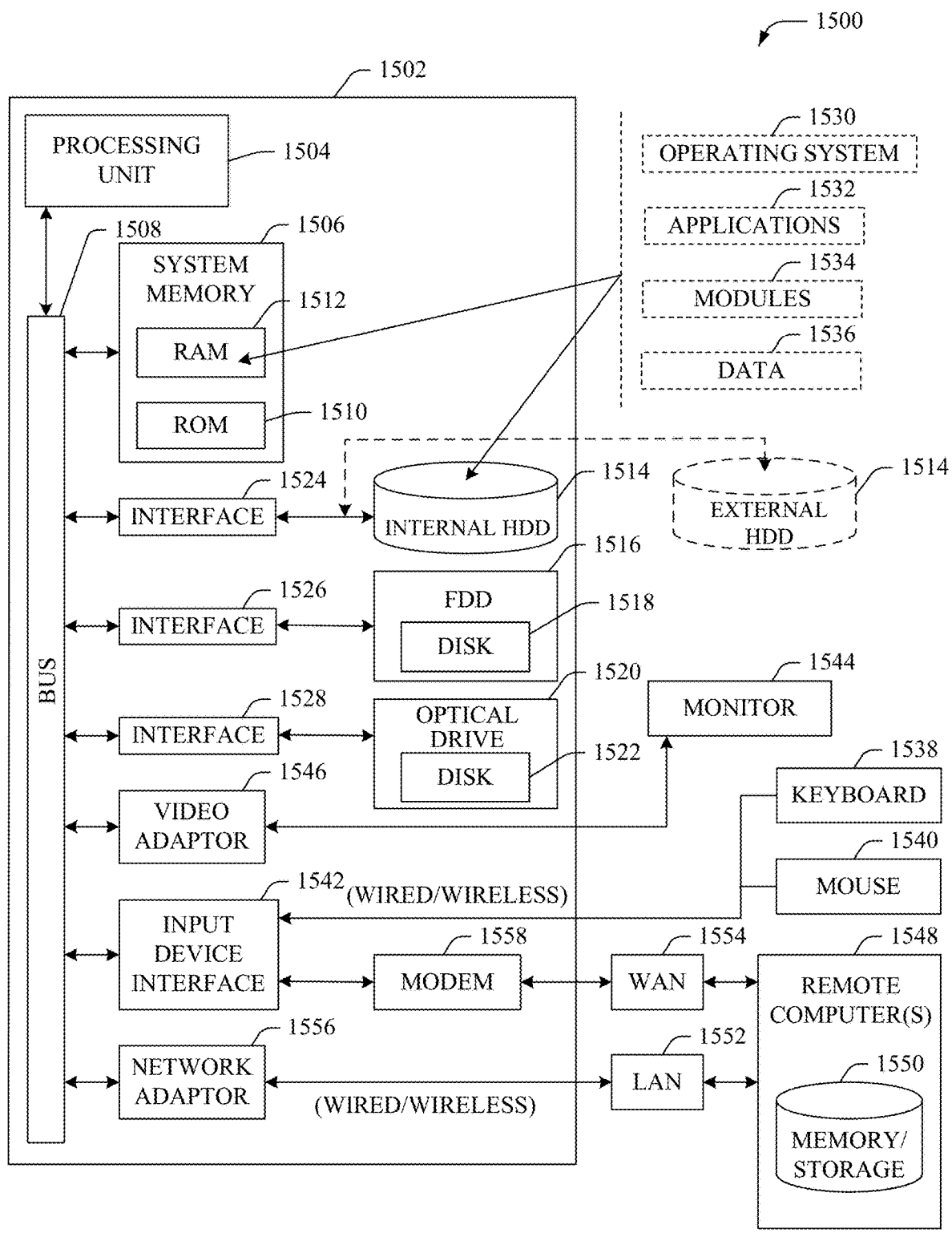
FIG. 15 illustrates a block diagram of a computer operable to execute the disclosed communication architecture.

Referring now to FIG. 15, there is illustrated a block diagram of a computer operable to execute the disclosed communication architecture. In order to provide additional context for various aspects of the subject specification, FIG. 15 and the following discussion are intended to provide a brief, general description of a suitable computing environment 1500 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 15, the example environment 1500 for implementing various aspects of the specification includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes read-only memory (ROM) 1510 and random access memory (RAM) 1512. A basic input/output system (BIOS) is stored in a non-volatile memory 1510 such as ROM, EPROM, EEPROM, which BIOS contains the basic routines that help to transfer information between elements within the computer 1502, such as during start-up. The RAM 1512 can also include a high-speed RAM such as static RAM for caching data.

The computer 1502 further includes an internal hard disk drive (HDD) 1514 (e.g., EIDE, SATA), which internal hard disk drive 1514 can also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. It is appreciated that the specification can be implemented with various commercially available operating systems or combinations of operating systems.

A user can enter commands and information into the computer 1502 through one or more wired/wireless input devices, e.g., a keyboard 1538 and a pointing device, such as a mouse 1540. Other input devices (not shown) can include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, an IEEE 1394 serial port, a game port, a USB port, an IR interface, etc.

A monitor 1544 or other type of display device is also connected to the system bus 1508 via an interface, such as a video adapter 1546. In addition to the monitor 1544, a computer typically includes other peripheral output devices (not shown), such as speakers, printers, etc.

The computer 1502 can operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, e.g., a wide area network (WAN) 1554. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 is connected to the local network 1552 through a wired and/or wireless communication network interface or adapter 1556. The adapter 1556 can facilitate wired or wireless communication to the LAN 1552, which can also include a wireless access point disposed thereon for communicating with the wireless adapter 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 via the serial port interface 1542. In a networked environment, program modules depicted relative to the computer 1502, or portions thereof, can be stored in the remote memory/storage device 1550. It will be appreciated that the network connections shown are example and other means of establishing a communications link between the computers can be used.

The computer 1502 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual bands), so the networks can provide real-world performance similar to the wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A femto access point device, comprising:
a processor; and
a memory that stores executable instructions that, when executed by the processor, facilitate performance of operations, comprising:
based on location data indicative of a geographical location of the femto access point device of a cellular network, determining route data indicative of a route selected from a group of routes, wherein the routes comprise a first route and a second route to direct communication data from the femto access point device to a network device of a local area network coupled to the femto access point device, wherein the communication data has been received from a user equipment device coupled to the femto access point device, and wherein the first route is determined based on first packet data protocol context data representing a first tuple comprising a first uplink data bandwidth value and a first downlink data bandwidth value and the second route is determined based on second packet data protocol context data representing a second tuple comprising a second uplink data bandwidth value and a second downlink data bandwidth value, and
during directing the communication data via the route, facilitating a mapping of first quality of service class data, assigned to the communication data, to second quality of service class data that is employed by the network device.

2. The femto access point device of claim 1, wherein the determining comprises determining the route data based on policy data indicative of a policy that reduces network congestion caused by data packets that are associated with the first quality of service class data.

3. The femto access point device of claim 2, wherein the operations further comprise:
receiving the policy data from a provisioning device of the cellular network, and wherein the provisioning device is coupled to the femto access point device via a backhaul link.

4. The femto access point device of claim 3, wherein the receiving comprises receiving the policy data during provisioning of the femto access point device.

5. The femto access point device of claim 1, wherein the operations further comprise:
modifying the first tuple associated with a connection between the user equipment device and a support node device of the cellular network that is coupled to the femto access point device.

6. The femto access point device of claim 5, wherein the operations further comprise:
initializing the second tuple associated with a second connection between the femto access point device and the support node device.

7. The femto access point device of claim 1, wherein the operations further comprise:
facilitating a translation of a first network address associated with the user equipment device to a second network address associated with the local area network.

8. The femto access point device of claim 1, wherein the facilitating of the mapping comprises facilitating the mapping based on mapping information stored in a data store of the femto access point device.

9. The femto access point device of claim 1, wherein the operations further comprise:
during the directing, determining fault condition data indicative of a fault condition associated with routing of the communication data.

10. The femto access point device of claim 9, wherein the network device is a first network device, and wherein the operations further comprise:
directing, to a second network device of the cellular network, alarm data associated with the fault condition.

11. The femto access point device of claim 9, wherein the fault condition data represents a domain name system failure.

12. A method, comprising:
selecting, by a femto access point device of a cellular network and comprising a processor, a route from routes that comprise a first route of the routes and a second route of the routes to direct communication data from the femto access point device to a device of a local area network coupled to the femto access point device, wherein the communication data has been received from a user equipment device coupled to the femto access point device, wherein the selecting comprises selecting the route based on location data indicative of a geographical location of the femto access point device, and wherein first route of the routes is determined based on first context data representing a first data structure comprising a first uplink bandwidth value and a first downlink bandwidth value and the second route of the routes is determined based on second context data representing a second data structure comprising a second uplink bandwidth value and a second downlink bandwidth value; and
facilitating, by the femto access point device, a conversion of first quality of service class data associated with the communication data, to second quality of service class data that is employed by the device.

13. The method of claim 12, further comprising:
directing, by the femto access point device, the communication data and the second quality of service class data to the device of the local area network via the route.

14. The method of claim 12, wherein the selecting comprises selecting the route based on policy data indicative of a policy that reduces network congestion caused by data packets associated with the first quality of service class data.

15. The method of claim 13, further comprising:
determining, by the femto access point device, alarm data indicative of a fault condition associated with the directing.

16. The method of claim 15, wherein the determining comprises determining domain name system failure data.

17. The method of claim 15, further comprising:
facilitating, by the femto access point device, a transmission of the alarm data to a network device of the cellular network via a backhaul link.

18. A non-transitory machine-readable storage medium, comprising executable instructions that, when executed by a processor of a femto access point device of a cellular network, facilitate performance of operations, comprising:
determining first quality of service class data associated with communication data, received from a user equipment device coupled to the femto access point device;
facilitating a conversion of the first quality of service class data of the communication data, to second quality of service class data that is employable by a device of a local area network coupled to the femto access point device; and
directing the communication data and the second quality of service class data to the device via a route that is selected from routes that comprise a first route of the routes and a second route of the routes to transmit the communication data from the femto access point device to the device of the local area network, wherein the route is selected based on location data that represents a geographical location of the femto access point device and wherein the first route is determined based on first packet data protocol context data representing a first data structure comprising a first uplink data bandwidth value and a first downlink data bandwidth value and the second route is determined based on first packet data protocol context data representing a second data structure comprising a second uplink data bandwidth value and a second downlink bandwidth value.

19. The non-transitory machine-readable storage medium of claim 18, wherein the route is selected from the routes based on policy data received from a provisioning device coupled to the femto access point device via a backhaul link.

20. The non-transitory machine-readable storage medium of claim 19, wherein the facilitating the conversion comprises facilitating the conversion based on mapping information stored in a data store of the femto access point device.

* * * * *